US011256752B2

(12) United States Patent
Kandur Raja et al.

(10) Patent No.: US 11,256,752 B2
(45) Date of Patent: Feb. 22, 2022

(54) CONTEXTUAL RECOMMENDATION

(71) Applicant: Samsung Electronics Co., Ltd., Suwon-si (KR)

(72) Inventors: Barath Raj Kandur Raja, Bangalore (IN); Ankur Agarwal, Bangalore (IN); Arko Sabui, Bangalore (IN); Arjun Raj Kumar S, Bangalore (IN); Shashank Sriram, Bangalore (IN); Himanshi Sinha, Bangalore (IN); Ketki Aniruddha Gupte, Bangalore (IN); Vibhav Agarwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 16/401,619

(22) Filed: May 2, 2019

(65) Prior Publication Data

US 2019/0340202 A1    Nov. 7, 2019

(30) Foreign Application Priority Data

May 2, 2018  (IN) .............................. 201841016587
Feb. 15, 2019 (IN) .............................. 201841016587

(51) Int. Cl.
*G06F 16/9032* (2019.01)
*G06F 16/93* (2019.01)
*G06F 40/30* (2020.01)
*G06F 40/295* (2020.01)

(52) U.S. Cl.
CPC ........ *G06F 16/90332* (2019.01); *G06F 16/94* (2019.01); *G06F 40/295* (2020.01); *G06F 40/30* (2020.01)

(58) Field of Classification Search
None
See application file for complete search history.

(56) References Cited

U.S. PATENT DOCUMENTS

| 8,762,156 | B2 * | 6/2014 | Chen ..................... G10L 15/183 704/275 |
| 9,754,016 | B1 | 9/2017 | Bozarth et al. |
| 2009/0150156 | A1 | 6/2009 | Kennewick et al. |
| 2011/0296374 | A1 | 12/2011 | Wu et al. |

(Continued)

FOREIGN PATENT DOCUMENTS

EP            3200185 A1    8/2017

OTHER PUBLICATIONS

International Search Report and Written Opinion dated Aug. 8, 2019, issued in an International application No. PCT/KR2019/005287.

(Continued)

*Primary Examiner* — Antim G Shah
(74) *Attorney, Agent, or Firm* — Jefferson IP Law, LLP

(57) ABSTRACT

An electronic device for providing contextual recommendations and a method therefor are provided. The electronic device includes a memory storing instructions, and at least one processor configured to execute the instructions to obtain text including characters, identify, based on a language model, a domain corresponding to the text, identify a reference of the characters based on the domain, and perform, based on the reference, an action related to the domain.

14 Claims, 40 Drawing Sheets

(56) References Cited

U.S. PATENT DOCUMENTS

| | | | |
|---|---|---|---|
| 2012/0265528 A1* | 10/2012 | Gruber | G10L 15/183 |
| | | | 704/235 |
| 2013/0060862 A1 | 3/2013 | Douillet et al. | |
| 2014/0316784 A1 | 10/2014 | Bradford et al. | |
| 2015/0019665 A1* | 1/2015 | Linner | H04W 4/14 |
| | | | 709/206 |
| 2015/0309984 A1 | 10/2015 | Bradford et al. | |
| 2015/0373183 A1* | 12/2015 | Woolsey | H04M 1/72448 |
| | | | 348/14.08 |
| 2017/0004184 A1 | 1/2017 | Jain et al. | |
| 2017/0092264 A1 | 3/2017 | Hakkani-Tur et al. | |
| 2017/0178626 A1 | 6/2017 | Gruber et al. | |
| 2017/0249017 A1 | 8/2017 | Ryu et al. | |
| 2017/0308291 A1* | 10/2017 | Luipold | G06F 16/2455 |
| 2018/0040020 A1 | 2/2018 | Kurian et al. | |

OTHER PUBLICATIONS

European Search Report dated Apr. 9, 2021, issued in European Application No. 19795894.5.

* cited by examiner

| Sentence Typed | Exsisting System 1 | Exsisting System 2 | Exsisting System 3 | Exsisting System 4 | Domain-Specific LM |
|---|---|---|---|---|---|
| Share this | is, with, information | with, with you, information | with, info, and | with, story, information | Picture (co-reference linked), with, image |
| Send this | is, out, to | email, to, out | email, info, picture | message, letter, name | Link (URL co-ref) |
| Call | you, me, when | me, when, emoji | me, the, us | it, me, the | him (co ref), Jessica (contact linked), james |
| Call j | j, just, Jim | u, j, I | just, jimmy | John, Joe, Jim | Jessica (contact), jimmy, james |
| Can you send me | a, the, know | a, the, your | the, a, your | a, the, some | the link (URL co ref) |
| Can you send | a, me, the | me, me the, the | the, it, a | me, us, a | the picture (media co-ref) |
| Book a cab from home to | you, get, see | a, the, your | the, get, pick | the, a, new | work (location co ref), airport |
| Today plan to | go, be, come | be, be able, get | be, come, make | make, get, be | dine (calendar event co ref) |
| TripAdvisor is good. Install | it, the, a | the, it, a | the, new, a | the, a, an | it (TripAdvisor app co ref) |
| Connect to the | orthopedic, internet, WIFI | computer, internet, network | computer, new, internet | other, new, next | smartTV, smartOven (smart device) |
| Reply to | my, this, your | this, this email, me | my, the, your | the, your, that | jack's email (co ref) |
| Open the | file, door, attachment | file, door, attachment | door, app, day | door, window, doors | doc, ppt (co ref) |
| Book | and, a, it | and, a, emoji | a, your, the | cab, a, the | appointment (co ref to user calendar event) |
| Play | it, with, the | a, with, emoji | it, with, the | the, a, with | song (co ref to user playlist) |

GENERIC PREDICTION — (Exsisting System 1–4)

CONTEXTUAL, DOMAIN-SPECIFIC, CO-REFERENCE LINKED — (Domain-Specific LM)

FIG. 9

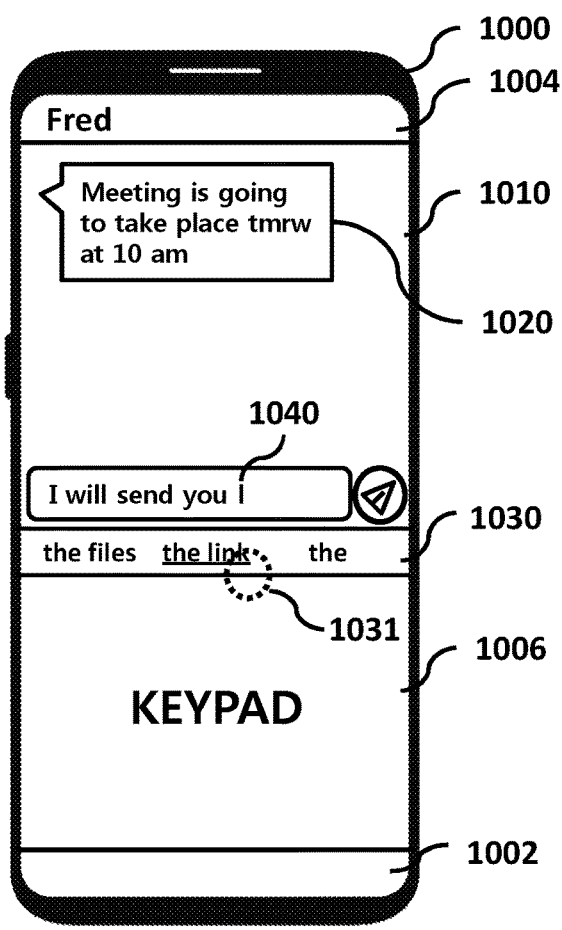
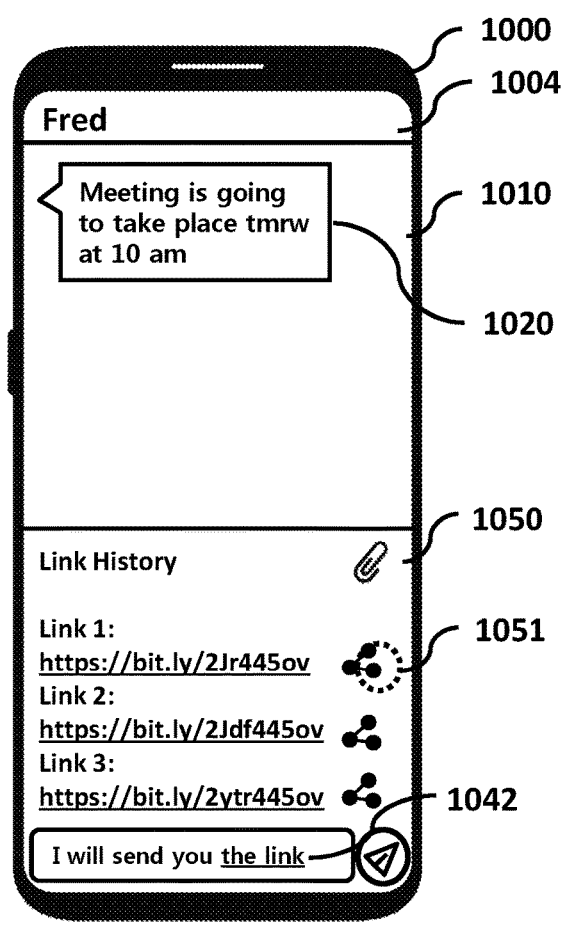
FIG. 10A
FIG. 10B

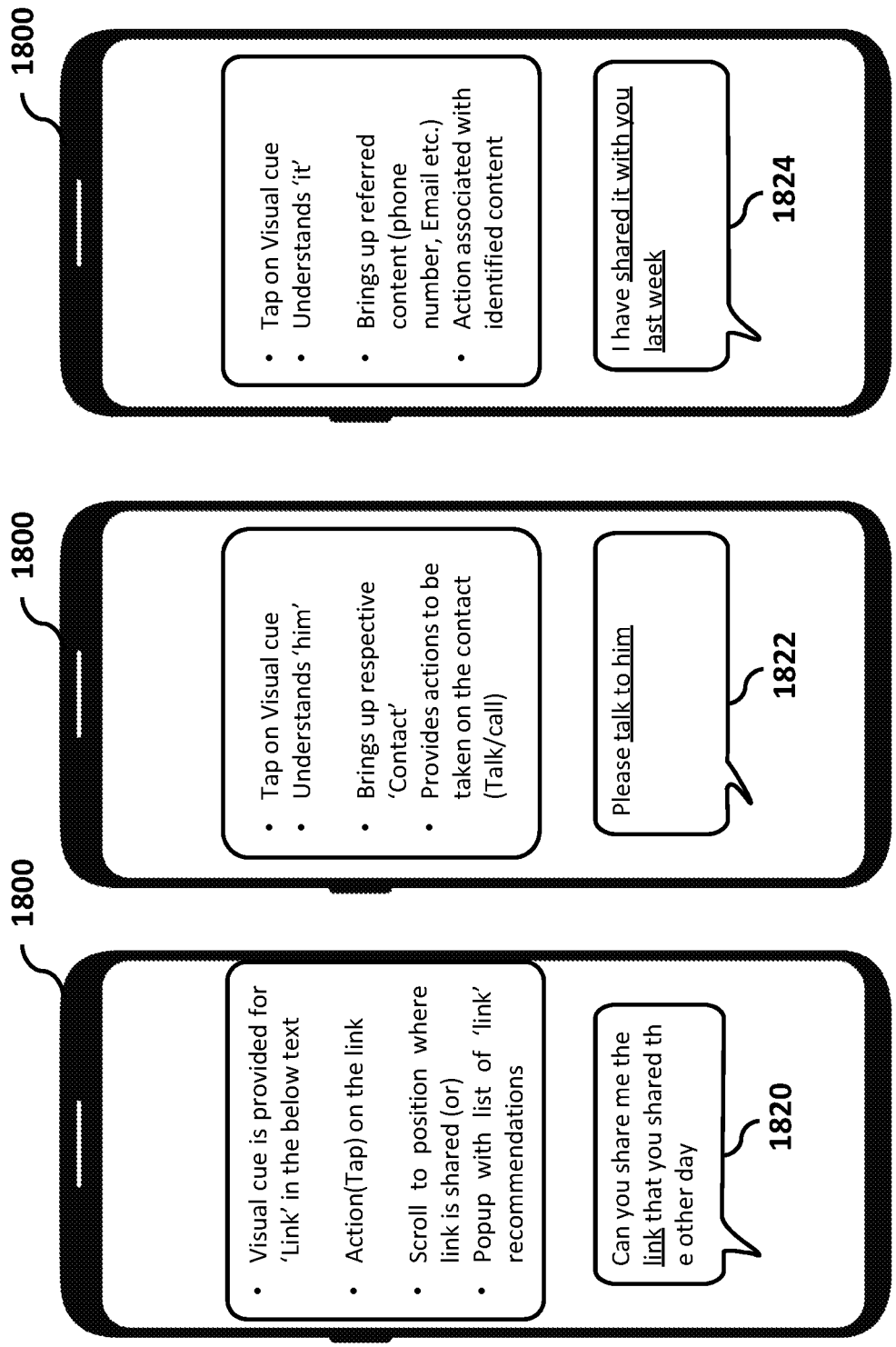

CONTEXTUAL RECOMMENDATION

CROSS-REFERENCE TO RELATED APPLICATION(S)

This application is based on and claims priority under 35 U.S.C. § 119(a) of an Indian patent application number 201841016587, filed on May 2, 2018, and of an Indian patent application number 201841016587, filed on Feb. 15, 2019, in the Indian Patent Office, the disclosure of each of which is incorporated by reference herein in its entirety.

BACKGROUND

1. Field

The disclosure relates to an electronic device, a method, and a computer program. More particularly, the disclosure relates to providing contextual recommendations.

2. Description of Related Art

In general, language recognition systems enable users to create/enter text on user devices using one or more input modes with increased reliability. Examples of the one or more input modes may be, but is not limited to, a text input mode, a speech input mode, a handwriting input mode and so on. The one or more input modes may provide predictive completion features and recommend word completion, word correction, a possible next word and so on based on user inputs.

Existing language recognition systems rely on a language model built with open domain/corpus for providing the recommendations. However, the recommendations provided by the existing language recognition systems often do not perfectly match with the user's language usage/user context. In addition, the language model used by the existing language recognition systems may not able to understand the context of the user inputs received from a virtual assistant. This may result in the user having a poor experience when typing on the user devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device, comprising a memory storing instructions, and at least one processor configured to execute the instructions to obtain text including characters, identify, based on a language model, a domain corresponding to the text, identify a reference of the characters based on the domain, and perform, based on the reference, an action related to the domain.

Additional aspects will be set forth in part in the description which follows and, in part, will be apparent from the description, or may be learned by practice of the presented embodiments.

In accordance with an aspect of the disclosure, a method is provided. The method includes obtaining text including characters, identifying, based on a language model, a domain corresponding to the text, identifying a reference of the characters based on the domain, and performing, based on the reference, an action related to the domain.

In accordance with another aspect of the disclosure, a non-transitory computer readable medium is provided. The non-transitory computer readable medium includes instructions which, when executed by at least one processor, cause the electronic device to obtain text including characters, identify, based on a language model, a domain corresponding to the text, identify a reference of the characters based on the domain, and perform, based on the reference, an action related to the domain.

In accordance with another aspect of the disclosure, methods and systems for providing contextual recommendations to a user based on one or more inputs provided by a user, wherein the contextual recommendations are related to a domain determined for the input are provided. The methods include determining at least one domain for the at least one input using a Domain-specific language model (LM). The method further includes performing a co-reference resolution to determine at least one co-reference for the at least one input, wherein the co-reference resolution is performed based on the at least one domain identified for the at least one input. The method further includes resolving the determined at least one co-reference to provide at least one recommendation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects features, and advantages of certain embodiments of the disclosure will be more apparent from the following description taken in conjunction with the accompanying drawings, in which:

FIG. 9 is an example table for explaining difference between recommendations provided, and recommendations provided by existing systems according to an embodiment of the disclosure;

FIGS. 10A, 10B, and 10C illustrate example user interfaces for providing contextual links to a user as recommendations according to various embodiments of the disclosure;

FIGS. 18A, 18B, and 18C illustrate example user interfaces including a visual cue according to various embodiments of the disclosure;

Throughout the drawings, like reference numerals will be understood to refer to like parts, components, and structures.

DETAILED DESCRIPTION

Figure 1:
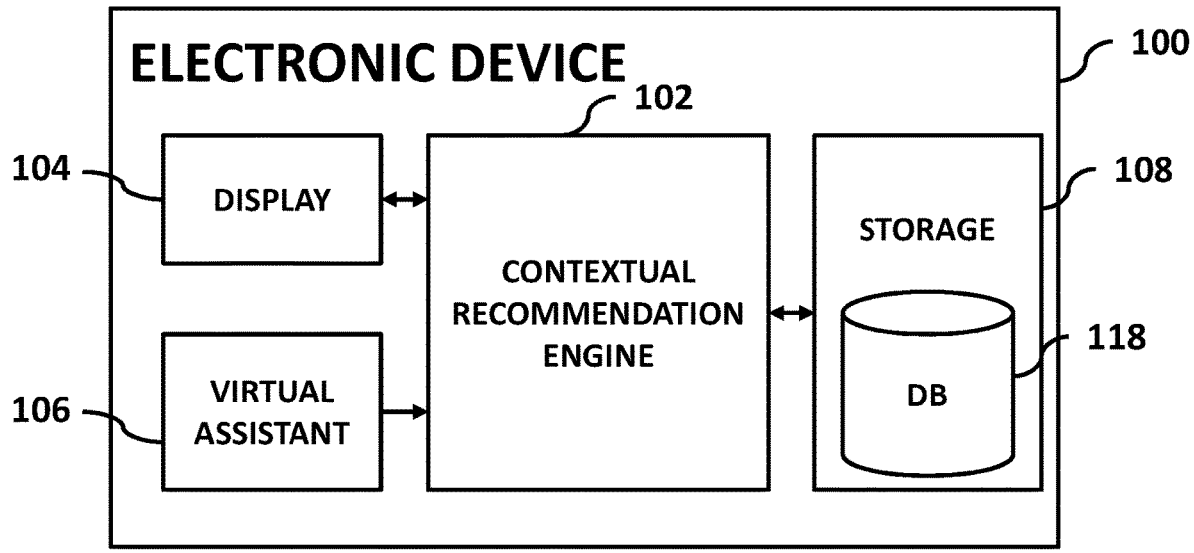
FIG. 1 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

The electronic device 1000 a smartphone, a tablet, a wearable device, a cellular phone, an Internet of things (IoT) device, a personal digital assistant, a media player, a portable multimedia player, a e-book reader, a digital broadcast device, a personal computer, a laptop computer, a micro server, a navigation, a vehicle infotainment system, a medical device, a game console, an MP3 player, a digital camera, but is not limited thereto.

The various embodiments herein disclose methods and systems for providing contextual recommendations based on at least one user input, wherein the contextual recommendations are provided to a user based on a domain determined for the user inputs, a co-reference resolution and a biased Domain-specific language model (LM).

FIG. 1 is a block diagram of an electronic device according to an embodiment of the disclosure.

The electronic device 100 may provide a contextual recommendation to a user according to an input provided by the user. The electronic device 100 may also be referred to herein as a user device. The electronic device 100 may be further connected to a server (not shown) using at least one of the Internet, a wired network (a Local Area Network (LAN), Ethernet and so on), a wireless network (a Wi-Fi network, a cellular network, a Wi-Fi Hotspot, Bluetooth, Zigbee and so on) and so on for retrieving required data. The electronic device 100 may also retrieve the data from the external databases (not shown). In an example herein, the external database may be an object-action list database, an antecedent database, an anaphor database or the like. In an embodiment, a device such a server may be implemented for providing the contextual recommendations based on at least one input provided by the user to the electronic device 100. In another embodiment, the electronic device 100 may be connected to a cloud platform through a gateway.

The electronic device 100 includes a contextual recommendation engine 102, a display unit 104, a virtual assistant unit 106, and a storage unit 108, which may further include a local database 118.

The display unit 104 and the virtual assistant unit 106 may be configured to receive at least one input from the user when the user is interacting with the electronic device 100. The input may be, but not limited to, a text input (using a virtual keyboard, a physical keyboard, and so on), a voice input and so on.

The display unit 104 may be configured to display a virtual keyboard on a display screen and to receive the text input from the user. The text input may be in form of characters. Examples of the text input may be, but not limited to, a letter, a string (a word, a sentence, a phrase or the like), and a number and so on. Further, the user may enter the text input on the virtual keyboard in any suitable applications such as, but not limited to, a calendar application, a messaging application, an electronic mail application, an address book (a contact) application, a web browser application, a cab related application, a gallery application or any other application resident on the electronic device 100 or accessible by the electronic device 100 by connecting to at least one of the server and the external databases. Embodiments herein may consider the applications as domains. In an embodiment herein, a physical keyboard coupled with the electronic device 100 may be used to receive the text input from the user.

The virtual assistant unit 106 may be configured to receive the voice input from the user. In an embodiment, the virtual assistant unit 106 may be integrated with the electronic device 100. The voice input may be in form of uttered phrases/queries/statements and so on. The virtual assistant unit 106 may be a device that enables the user to interact with the virtual assistant unit 106 using uttered phrases/queries/statements/commands.

The contextual recommendation engine 102 may be composed of at least one of a single processor, a plurality of processors, multiple homogenous cores, multiple heterogeneous cores, multiple central processing units (CPUs) of different kinds and so on. The contextual recommendation engine 102 may be coupled to the display unit 104 and the virtual assistant unit 106 to receive the input provided by the user. On receiving the input provided by the user from the at least one of the display unit 104 and the virtual assistant unit 106, the contextual recommendation engine 102 provides the contextual recommendations when the user is entering/providing the input in any suitable domains/applications. Examples of the contextual recommendations referred herein may be, but not limited to, an object, a visual cue for the object (an underlined object/link of the object/hyperlink for the object and so on), an action that may be performed on the visual cue (tap to auto scroll) and so on. Examples of the object may be, but not limited to, text (a word, a sentence, a phrase, an antecedent, an anaphora and so on), a natural language generation (NLG), a contact, an image, a video and so on.

On receiving the input provided by the user, the contextual recommendation engine 102 analyzes the input and determines the domain for the input. The contextual recommendation engine 102 may also determine objects related to the domain determined for the input. The objects may be, but is not limited to, a word, a sentence, a phrase, a contact and so on. In an embodiment, the contextual recommendation engine 102 uses a domain-specific language model (LM) to determine the domain for the input and the objects related to the domain. The determined objects may be displayed (by the display unit 104) as recommendations to the user. Thus, the user may consider recommended objects for input completion, input correction, as a possible next object and so on. For example, when the text provided by the user is "connect to", the contextual recommendation engine 102 may determine "IoT home hub" as the domain. Further, the contextual recommendation engine 102 determines the objects such as "Dex station", "smart TV", "refrigerator" and so on as relevant to the domain. The objects that are relevant to the domain may be displayed as recommendations to the user.

For example, when the text provided by the user is "call J", the contextual recommendation engine 102 may determine "contact" as the domain. Further, the contextual recommendation engine 102 determines the objects such as "James", Jessica", "Jack" and so on as relevant to the domain. The objects that are relevant to the domain may be displayed as recommendations to the user for completing the user input.

The contextual recommendation engine 102 performs a co-reference resolution based on user input history (obtained from the local database 118) and cues from the domain determined for the input. The co-reference resolution may be performed to provide the co-references for the input which includes characters of text. For example, the co-reference of the characters may coincide with a reference of the characters. The co-references may include an antecedent, an anaphora, mentions and so on present in the input text, but is not limited thereto. The antecedent may be included in the text obtained in the electronic device. That is, the antecedent may be words stored in the user input history. The antecedent may be included in text obtained in the electronic device within a certain period. The contextual recommendation engine 102 further provides a visual cue for the co-references. The visual cue herein refers to at least one of an underlined antecedent, an underlined anaphora, and underlined mentions and so on. The co-references and the visual cue may be provided (by the display unit 104) to the user as the recommendations.

The contextual recommendation engine 102 further resolves the co-references based on the domain determined for the input, the performed co-reference resolution and biases calculated for the Domain-specific LM. The contextual recommendation engine 102 resolves the co-references for determining the actions that may be performed on the visual cue. The determined actions may be provided to the user as suggestions.

In an embodiment, the contextual recommendation engine 102 may continuously or periodically identify and interpret the inputs provided by the user in different domains. The contextual recommendation engine 102 may classify the interpreted inputs to the different domains to build the Domain-specific LM. The contextual recommendation engine 102 applies the Domain-specific LM on a current input provided by the user in the specific domain and provides the co-reference resolution (which may include objects, actions as recommendations) for the input provided in the specific domain.

The storage unit 108 may be configured to store the inputs provided by the user, the recommendations provided for the input and so on in a local database 118.

FIG. 1 shows units of the electronic device 100, but it is to be understood that other embodiments are not limited thereon. In other embodiments, the electronic device 100 may include less or more number of units. Further, the labels or names of the units are used only for illustrative purpose and does not limit the scope of the various embodiments herein. One or more units may be combined together to perform same or substantially similar function in the electronic device 100.

Figure 2:
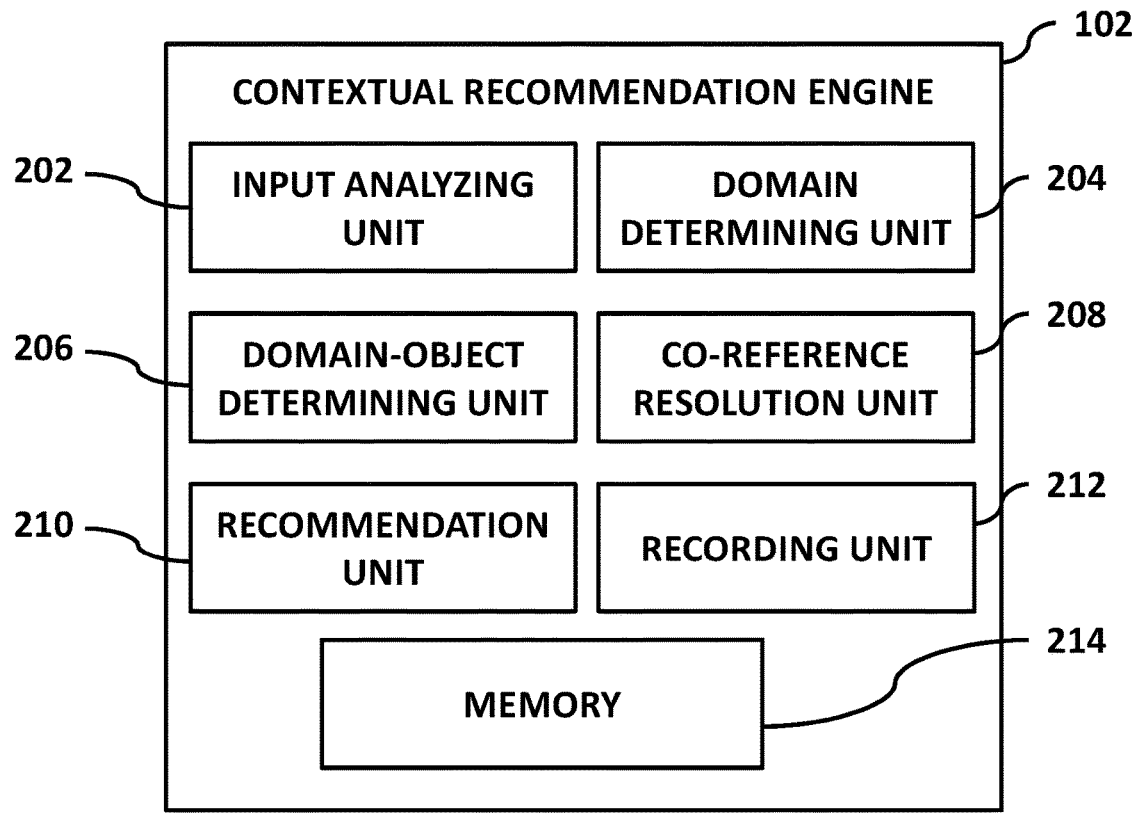
FIG. 2 is a block diagram of a contextual recommendation engine according to an embodiment of the disclosure.

FIG. 2 is a block diagram of a contextual recommendation engine according to an embodiment of the disclosure.

Referring to FIG. 2, the contextual recommendation engine 102 may include various units to provide a contextual recommendation to a user according to inputs provided by the user. The contextual recommendation engine 102 includes an input analyzing unit 202, a domain determination unit 204, a domain-object determination unit 206, a co-reference resolution unit 208, a recommendation unit 210, a recording unit 212 and a memory 214.

The input analyzing unit 202 may be configured to analyze the inputs on receiving the inputs which is provided by the user from the at least one of the display unit 104 and the virtual assistant unit 106. In an embodiment, the input analyzing unit 202 uses a natural language processing (NLP) technique to analyze the input. Embodiments herein are explained using the NLP technique to analyze the input, but it may be obvious to a person of ordinary skill in the art that any other text processing techniques may be used for analyzing the input. In addition, the input may be analyzed to identify at least one of antecedents and anaphors present in the input. The antecedents herein may refer to nouns and may be at least one of multimedia, location, names, and links and so on. The anaphors herein refer to pronouns and may be at least one of 'it', 'this', 'that', 'his', 'her', 'its' and so on.

The domain determination unit 204 and the domain-object determination unit 206 operate in parallel to determine the domain for the input and the objects related to the domain respectively.

The domain determination unit 204 may be configured to determine the domain for the input on receiving the analyzed input from the input analyzing unit 202. The domain determination unit 204 determines the domain for the input using the Domain-Specific LM (trained Language model). The Domain-specific LM may be a character aware model which may be built using a combination of recurrent neural networks (RNN) and convolutional neural networks (CNN). In an embodiment, the Domain-Specific LM may be built by identifying and interpreting data set (resident on the electronic device 100, an external database, an external server and so on) associated with different domains and input provided by the user in the different domains. Further, the identified and interpreted inputs in the different domains may be classified to build the Domain-Specific LM. Further, the Domain-Specific LM includes learned filters which are derived based on the data set and inputs associated with different domains.

Embodiments herein provide the analyzed input and the Domain-specific LM as inputs to the domain determination unit 204. The domain determination unit 204 determines the domain related to the input using a convolutional layer, a pooling layer, an attention layer and a Softmax layer. The domain determination unit 204 passes the input and the learned filters of the Domain-specific LM to the convolutional layer. The convolution layer convolves the input with the learned filters. An output of the convolution layer may be passed to the pooling layer. The pooling layer may perform a maximum (MAX) operation, a minimum (MIN) operation or an average (AVG) operation on the output of convolution layer and represent the input in a vector format (an input feature vector). The domain determination unit 204 may pass the input feature vector and previous inputs to the attention layer as inputs. The attention layer derives a context vector for the received inputs. Further, the output of attention layer may be passed to the Softmax layer as input. The Softmax layer uses a sigmoid function for processing the received inputs, determines the related domains for the input and generates a categorical probability distribution for the related domains determined for the input. Based on the probability distribution, the Softmax layer determines the related domain for the input. In an example herein, the input provided by the user may be "David, book a cab and let's share its . . . ". The domain determination unit 204 determines a cab related application as the domain for the input using the Domain-specific LM.

The domain-object determination unit 206 may be configured to determine the objects related to the domain determined for the input. In an embodiment, the domain-object determination unit 206 uses the Domain-specific LM for determining the objects for the domain determined for the input. On identifying the input provided by the user, the domain-object determination unit 206 analyzes open-corpus/data set of the Domain-specific LM/trained LM. The data set of the trained LM may include a data set of the domains with respective vocabulary. The domain-object determination unit 206 feeds the input to a character-embedding layer. The character-embedding layer processes the characters of the input. The character-embedding layer forms a vector for each word of the input by processing the characters of the input. The domain-object determination unit 206 passes the vector formed for each word of the input and passes the input to the convolutional layer. The convolutional layer performs the convolution of the input with the vector formed for each word to produce a plurality of words/objects. An output of the convolutional layer may be passed to a highway layer. The highway layer may control the flow of the output of the convolutional layer to the LM engine including a LM data structure and an inference engine. The highway layer selects the plurality of words/objects from the output of the convolutional layer to pass to the LM engine. Further, the highway layer represents the selected plurality of words in a feature vector and passes the feature vector to the LM engine. The feature vector may include the floating numbers corresponding to the selected plurality of words. The LM engine processes the feature vector using a long short-term memory (LSTM) layer and a Softmax layer and generates hidden states. The LSTM layer processes the feature vector of the plurality of words/objects and provides output information relevant to each word/object (whether the word is a verb or noun or what may conjugate with the word or the like). Based on the output information, the Softmax Layer generates the hidden states. The hidden states outputted by the LM engine include a plurality of grammatically corrected objects/words related to the domains. Further, the domain-object determination unit 206 estimates a probability distribution over the generated hidden states based on the domain determined for the input. Based on the estimated probability distribution, the domain-object determination unit 206 determines grammatically corrected and domain-related objects (the objects that are related to the domain determined for the input). For example, consider a scenario, wherein the input provided by the user may be "David, book a cab and let's share its . . . " and the domain identified for the input may be the cab related application. Based on the domain identified for the input, the domain-object determination unit 206 may determine 'fare' as the object/word for the domain determined for the input using the Domain-specific LM. The domain-object determination unit 206 provides the determined objects to the display unit 104. The display unit displays the determined objects as recommendations for the user when the user is entering/providing the input to the user device 100.

The co-reference resolution unit 208 may be configured to perform co-reference resolution for determining the co-references (antecedents, anaphors, mentions and so on) for the input provided by the user. The co-reference resolution unit 208 performs the co-reference resolution based on the domain determined for the input and the user input history. The co-reference resolution unit 208 accesses the local database 118 and obtains the user input history. The co-reference resolution unit 208 represents the user input history in the form of the feature vector by detecting a plurality of words associated with the user input history. The feature vector includes floating point numbers representing the previous inputs. The co-reference resolution unit 208 passes the feature vector to the LM engine comprising of the LM data structure and the inference engine. The LM engine processes the feature vector using a bi-directional LSTM (Bi-LSTM) layer and a Softmax layer and generates the hidden states. The Bi-LSTM layer processes the feature vector and provides output information relevant to each word (whether the word is a verb or noun or what may conjugate with the word or the like). Based on the output information, the Softmax Layer generates the hidden states. In parallel, the co-reference resolution unit 208 analyzes the previous inputs and determines the antecedent list for the previous inputs using NLP techniques. The antecedents may refer to multimedia, names, location, and links, but are not limited thereto.

After determining the antecedents, the co-reference resolution unit 208 calculates non-probabilistic scores for the antecedents using a SLACK engine. The SLACK engine calculates the non-probabilistic score for the antecedents based on the domain determined for the input and the generated hidden states (by the Bi-LSTM engine). The co-reference resolution unit 208 determines the antecedent (present in the antecedent list) having the highest probabilistic score as a co-reference for the input provided by the user. In an embodiment, in case of presence of only the anaphors in the input, the co-reference resolution unit determines the anaphors as the co-references for the input. In another embodiment, in case of presence of the anaphors in the input provided by the user, the co-reference resolution unit 208 performs an anaphor resolution for linking the anaphors present in the input with the antecedents. The linked anaphors with antecedents may be determined as the co-reference for the input. Thus, the co-references referred herein may be at least one of the antecedents (having the highest non-probabilistic score), the anaphors present in the input, the mentions present in the input, the anaphors linked with the antecedents and so on. In an embodiment, the antecedents determined as the co-references for the input may be the objects recommended for the input by the domain-object determination unit 206. In addition, the co-reference resolution unit 208 updates the antecedent database by adding the determined antecedents to the antecedent database. Similarly, the co-reference resolution unit 208 updates the anaphor database by adding the determined anaphors to the anaphor database.

Further, the co-reference resolution unit 208 provides the visual cue for the co-references. The user may perform a pre-defined gesture (such as a tap gesture, a scroll gesture, a click gesture, and so on) on the visual cue to access the content related with the co-references. The co-reference resolution unit 208 provides the visual cue to the display unit 104. The display unit 104 displays the visual cue as the recommendation for the user. Thus, the user may access the relevant content by performing the gesture on the visual cue.

The recommendation unit 210 may be configured to resolve the co-references for providing the recommendations to the user when entering or providing the input. The recommendation unit 210 resolves the co-references based on the domain identified for the input, the co-reference input and the biases calculated for the Domain-specific LM.

The recommendation unit 210 performs biasing of the Domain-specific LM for deriving actions relevant to the objects or antecedents determined for the input. Biasing of the Domain specific LM includes boosting the probability for certain actions/antecedents based on the categorical probability distribution over the related domains obtained from the domain determination unit 204. The recommendation unit 210 accesses the user input history from the local database 118 and determines the objects available for the domain determined for the input. The recommendation unit 210 populates the antecedent list (present in the antecedent database) with the objects associated with the domain. The recommendation unit 210 further determines functions of the objects or actions related to the objects and supplements the antecedents present in the input with the determined functions of the objects or actions related to the objects. In an embodiment, the actions may include a NULL action for the textual entities if there is no action associated with the object. The recommendation unit 210 stores the objects and the corresponding functions/actions determined for the antecedent list in the object-action list database. The recommendation unit 210 further calculates the biases for the domain-specific LM to allow the actions in prediction of the objects for the input provided by the user.

The recommendation unit 210 receives the information about the determined co-references from the co-reference resolution unit 208 and resolves the co-references. The co-references may be resolved to provide the actions related to the objects/antecedents as suggestion for the user. The recommendation unit 210 resolves the co-references using the object-action database list. The recommendation unit 210 checks the object-action database list for loading the objects, the corresponding actions and the associated biases for the Domain-specific LM for the top-K antecedents of the antecedent list (determined by the co-reference resolution unit 208) determined for the input provided by the user. The loaded objects for the antecedents may be at least one of a contact card, images, videos, audios, and so on. The recommendation unit 210 provides the loaded actions from the object-action database to the display unit 104. The display unit 104 displays the objects and the corresponding actions to the user as the suggestions when the user performs the gesture on the visual cue provided for the co-references.

The recording unit 212 may be configured to record actions performed by the user in response to the recommendations provided to the user. The recording unit 212 updates the object-action list database by storing the actions performed by the user with respect to the object/co-reference in the object-action list database.

The memory 214 may be configured to store the domain identified for the input, the co-references provided for the input, the actions provided for the co-references and so on. The memory 214 may include one or more computer-readable storage media. The memory 214 may include non-volatile storage elements. Examples of such non-volatile storage elements may include magnetic hard discs, optical discs, floppy discs, flash memories, or forms of electrically programmable memories ROM (EPROM) or electrically erasable and programmable ROM (EEPROM) memories. In addition, the memory 214 may, in some examples, be considered as a non-transitory storage medium. The term "non-transitory" may indicate that the storage medium is not embodied in a carrier wave or a propagated signal. However, the term "non-transitory" should not be interpreted to mean that the memory 214 is non-movable. In some examples, the memory 214 may be configured to store larger amounts of information than the memory. In certain examples, a non-transitory storage medium may store data that can, over time, change (e.g., in random access memory (RAM) or cache).

FIG. 2 shows units of the contextual recommendation engine 102, but it is to be understood that other embodiments are not limited thereon. In other embodiments, the contextual recommendation engine 102 may include less or more number of units. Further, the labels or names of the units are used only for illustrative purpose and does not limit the scope of the various embodiments herein. One or more units may be combined together to perform same or substantially similar function in the contextual recommendation engine 102.

Figure 3A:
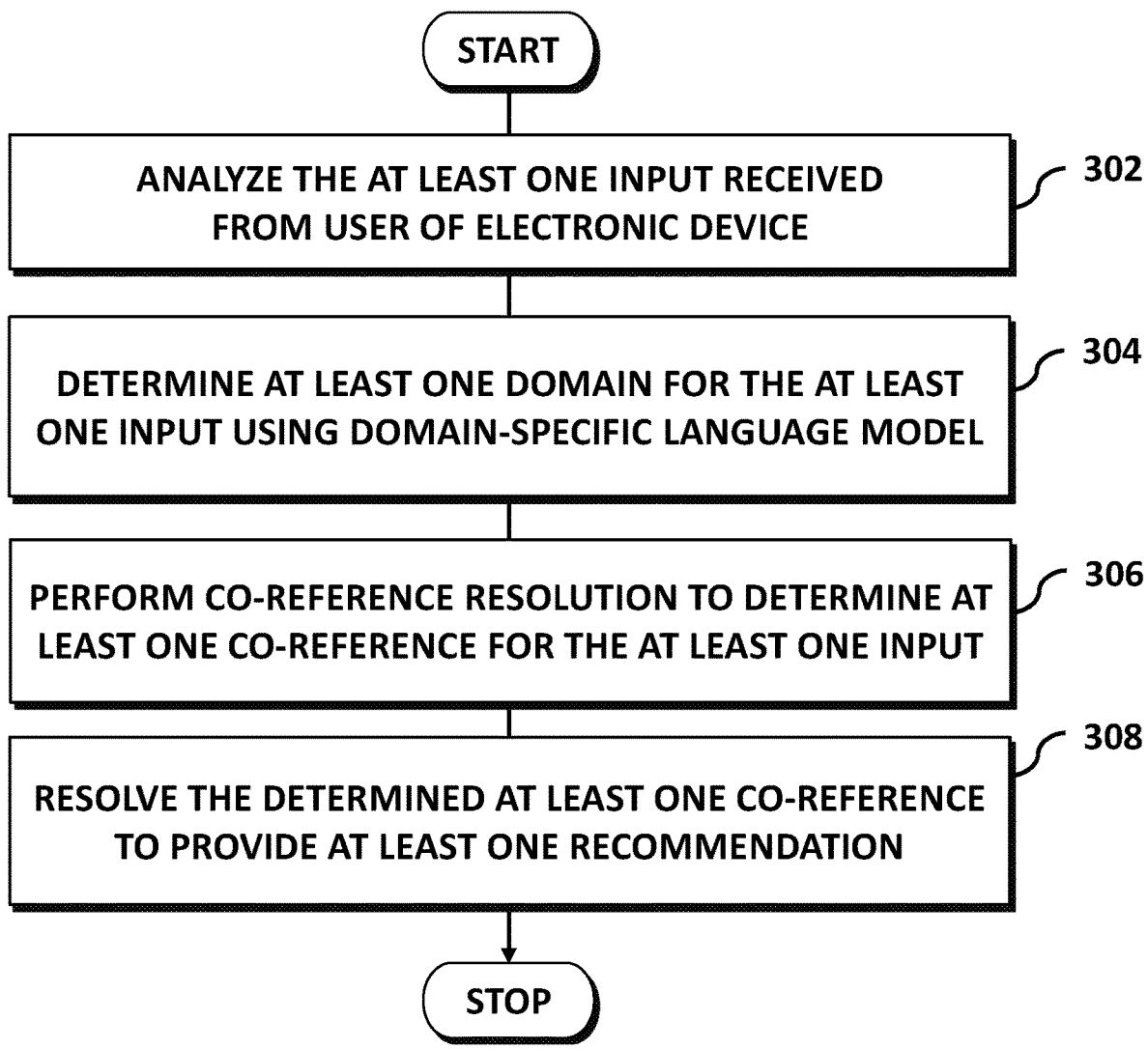
FIG. 3A is a flowchart illustrating a method of providing contextual recommendations according to an embodiment of the disclosure.

FIG. 3A is a flowchart illustrating a method of providing contextual recommendations according to an embodiment of the disclosure.

At operation 302, the method includes analyzing, by the contextual recommendation engine 102, the input received from the user of the user device 100. The contextual recommendation engine 102 determines the context of the input and determines the antecedents and anaphors present in the input.

At operation 304, the method includes determining, by the contextual recommendation engine 102, the domain for the input using the Domain-specific LM. The contextual recommendation engine 102 performs the convolution of the input with the learned filters to determine the related domains for the input. The related domains may be determined based on the determined context of the input. The contextual recommendation engine 102 processes the output of the convolution using the pooling layer, the attention layer and the Softmax layer and derives the domain representation. The domain representation indicates the probability for the related domains. Based on the domain representation, the contextual recommendation engine 102 determines the domain for the input. In an embodiment, the multiple domains may be determined for the input. In parallel, the contextual recommendation engine 102 determines the objects for the domain determined for the input. The contextual recommendation engine 102 determines the objects using the LM engine comprising of the LM data structure and the inference engine and the domain determined for the input.

At operation 306, the method includes performing, by the contextual recommendation engine 102, the co-reference resolution to determine the co-references for the input. The contextual recommendation engine 102 processes the user input history to form the feature vector and passes the feature vector to the LM engine. The contextual recommendation engine 102 processes the feature vector using the Bi-LSTM layer and the Softmax layer of the LM engine. Further, the contextual recommendation engine 102 determines the antecedent list for the user input history and calculates the non-probabilistic score for the antecedent list using the SLACK engine. The SLACK engine calculates the non-probabilistic score based on the output of the Bi-LSTM layer and the Softmax layer and the domain determined for the input. Based on the non-probabilistic score, the contextual recommendation engine 102 determines the antecedent of the antecedent list having the highest score as the co-reference for the input. In case of presence of the anaphor present in the input, the contextual recommendation engine 102 determines the anaphor as the c-reference for the input. The contextual recommendation engine 102 also performs the anaphora resolution to link the anaphor with the determined antecedent and determines the anaphora linked with the antecedent as the co-reference for the input. Further, the contextual recommendation engine 102 provides the visual cue for the co-reference. The visual cue may be provided by underlining the co-reference. The visual cue may allow the user to access the relevant content of the co-reference.

At operation 308, the method includes resolving, by the contextual recommendation engine 102, the determined co-references to provide the recommendations. The contextual recommendation engine 102 determines the actions for the objects determined for the input and performs the biasing of the domain-specific LM. The contextual recommendation engine 102 further supplements the antecedent list with the objects and the corresponding actions. In addition, the contextual recommendation engine 102 updates the object-action list database with the determined objects and the corresponding actions for the antecedent list.

For resolving the co-references, the contextual recommendation engine 102 access the obj ect-action database list and determines the actions for the co-references, wherein the co-references may include the antecedent, the anaphora, and the mention, but are not limited thereto. The contextual recommendation engine 102 provides the actions as the suggestions for the user. Thus, the recommendations provided for the user while entering the input may include at least one of the objects determined for the domain, the visual cue provided for the co-reference, the actions for the co-reference and so on. According to an embodiment, the unified and improved typing experience may be provided to the user.

The various actions, acts, blocks, operations, or the like in the method and the method may be performed in the order presented, in a different order or simultaneously. Further, in some embodiments, some of the actions, acts, blocks, operations, or the like may be omitted, added, modified, skipped, or the like without departing from the scope of the disclosure.

Figure 3B:
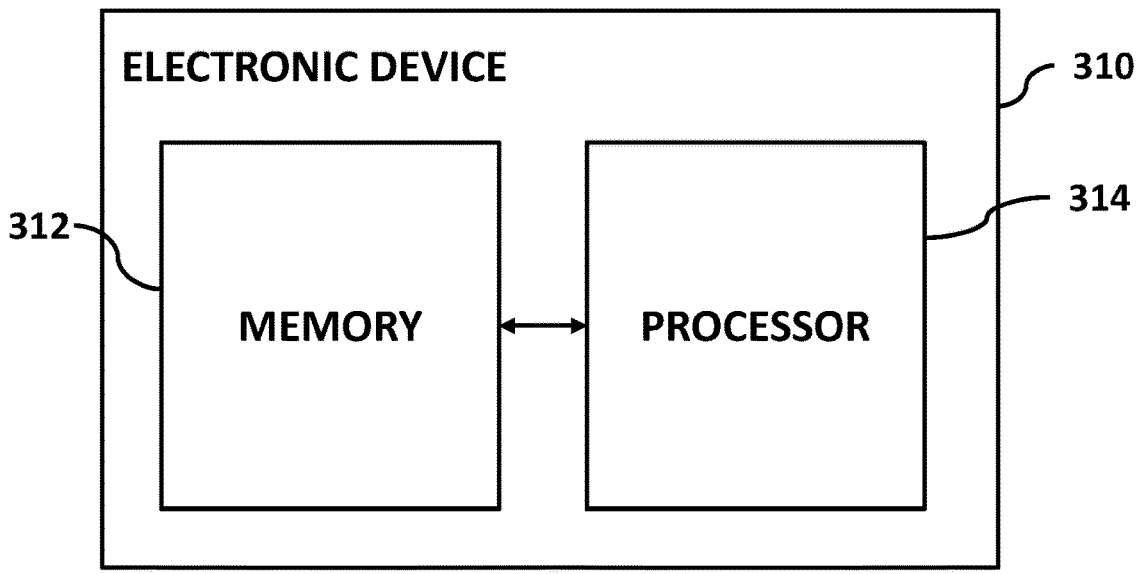
FIG. 3B is a block diagram of an electronic device according to an embodiment of the disclosure.

FIG. 3B is a block diagram of an electronic device according to an embodiment of the disclosure.

The electronic device 310 may include a memory 312 and a processor 314. The electronic device 310 may be the electronic device 100. The memory 312 of the electronic device 310 may correspond to the storage unit 108 of the electronic device 100, the memory 312 may store instructions for executing an operating system (OS), a computer program, an application, and so on.

The processor 314 of the electronic device 310 may be configured to execute the instructions stored on the memory 312. The instructions may be executed by the processor to cause the electronic device 310 to perform functions according to an embodiment.

The processor 314 of the electronic device 310 may perform functions of the contextual recommendation engine 102 of the electronic device 100. The processor 314 may include at least one processor. The processor 314 of the electronic device 310 may perform functions of the virtual assistant unit 106 of the electronic device 100.

Figure 3C:
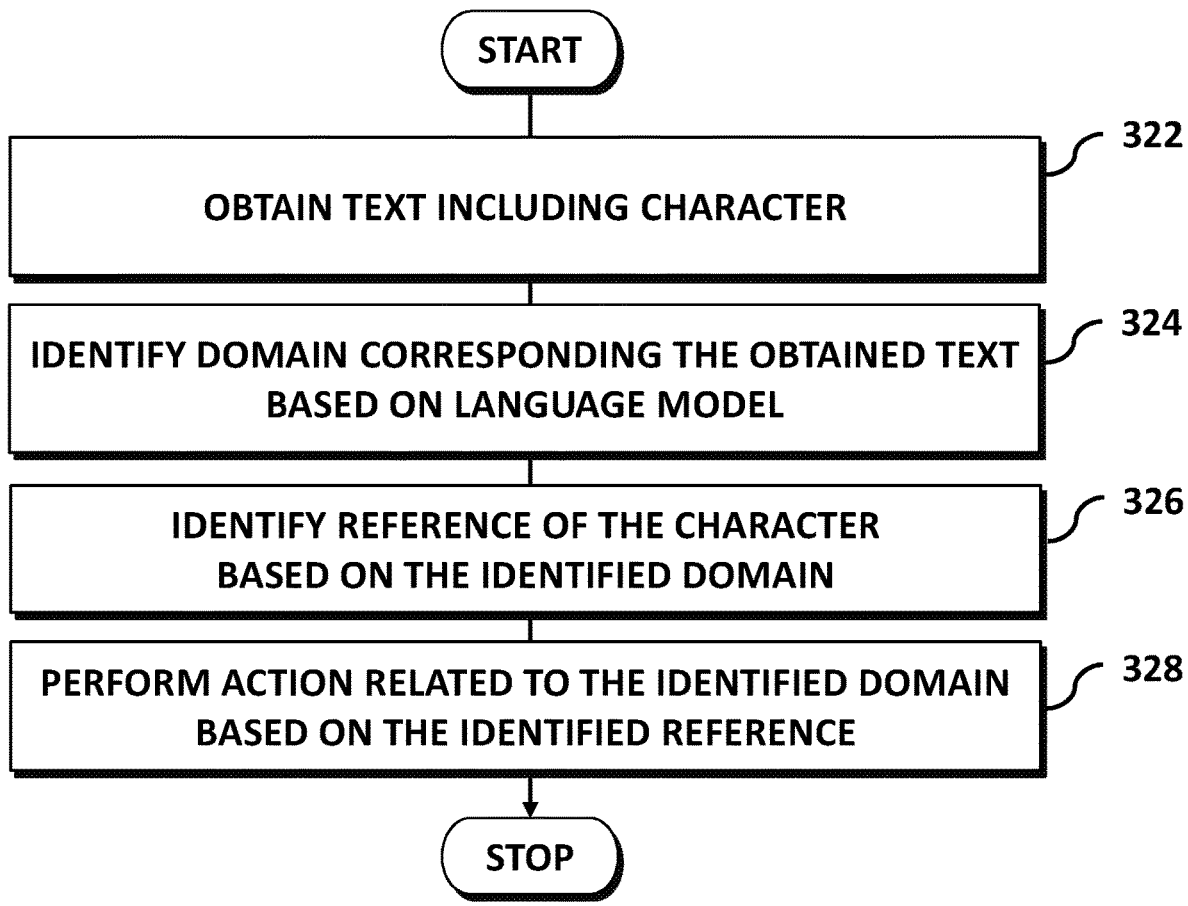
FIG. 3C is a flowchart illustrating a method according to an embodiment of the disclosure.

FIG. 3C is a flowchart illustrating a method according to an embodiment of the disclosure.

At operation 322, the electronic device may obtain text including characters. The text may be received by a user input. For example, the text may be obtained by a user typing or entering the text, or a voice uttered by a user. The text may further include numbers and symbols. The characters included in the text may consist of a word or a sentence, but may not complete the word or the sentence. That is, the characters included in the text may be a part of a word, or a part of a sentence. The text may be obtained through an application running on the electronic device.

In operation 324, the electronic device may identify, based on a language model, a domain corresponding to the obtained text. The domain may indicate an application executable by the processor of the electronic device, but is not limited thereto. The domain may indicate an application running on the foreground of the electronic device. The domain may indicate an application which has been running on the foreground of the electronic device before a virtual assistant application is popped up on the electronic device. The domain correlated the most with the characters included in the text may be identified among a plurality of domains. The correlation with the characters may be learned based on a language model. Methods for identifying a domain based on a language model, may be explained layer by referring to FIGS. 4A, 4B, 7A, and 7B.

Figure 5A:
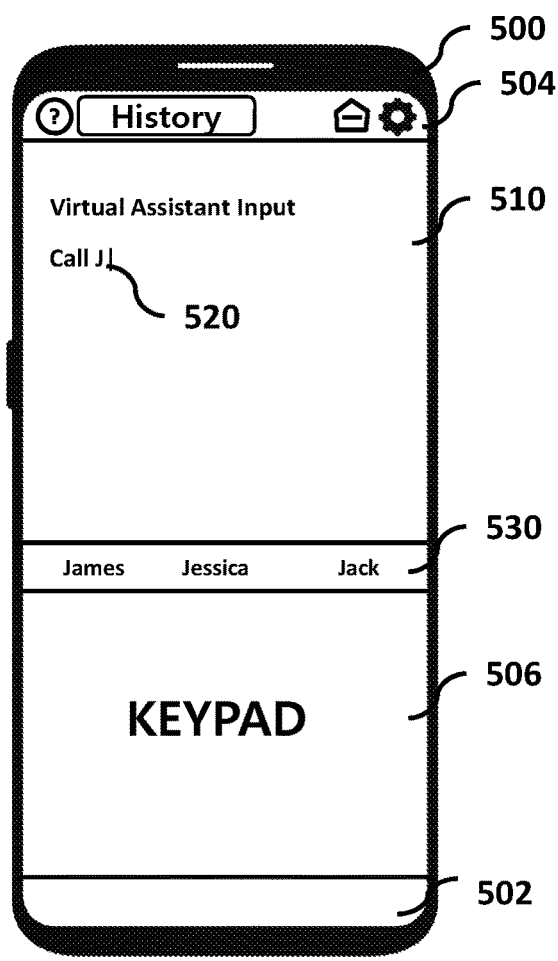
FIGS. 5A and 5B illustrate example user interfaces for providing recommendations to a user according to various embodiments of the disclosure.
Figure 5B:
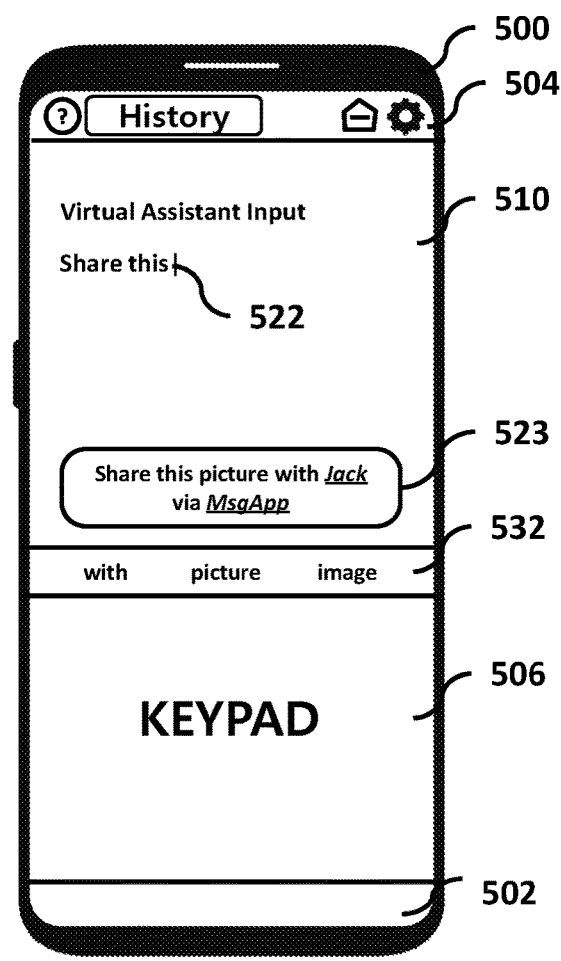

For example, when the obtained text is "share this" (as illustrated in FIG. 5B), an application for sharing a file or a picture, that is, a gallery application, an email application, or a messaging application may be identified as corresponding to the obtained text.

For example, when the obtained text is "Call J", an application for making a phone call, a messaging application may be identified as corresponding to the obtained text.

For example, when the obtained text is "Connect to the", an application for connecting other devices, such as IoT controlling application, a home-hub bridge application, a home hub application may be identified as corresponding to the obtained text.

For example, when the obtained text is "Open the", an application for opening a content or a file, such as a document editing application, a cloud application, a file navigation application may be identified as corresponding to the obtained text.

At operation 326, the electronic device may identify a reference of the characters based on the identified domain.

In an embodiment, when the characters includes a verb, an object for the verb may be identified as the reference based on the domain. For example, when the obtained text is "Share this" (as illustrated in FIG. 5B), an object of "Share" may be identified as the reference. If the electronic device has learned that the user often shares pictures with friends, the reference of "Share this" may be "a picture" When a screenshot is captured on the electronic device before obtaining the text, the reference of "Share this" may be the screenshot. In an embodiment, the reference may be one identified among a plurality of candidate objects. That is, the plurality of objects may be identified as candidates for the reference of the characters based on the domain. For example, "picture" and "screenshot" may be displayed as reference candidate objects on the electronic device, an object selected by a user among the displayed plurality of references may be identified as the reference.

For example, when the obtained text is "send you", an object for "send" may be identified as the reference. An object for a verb may be a direct object, or an indirect object. As the references of "send", "the link", "the files" may be identified.

In an embodiment, a word or a noun including at least a part of the characters may be identified as the reference. For example, when the obtained text is "Call J" (as illustrated in FIG. 5A), a word or a noun including "J", and being an object for "Call" may be identified as the reference. For example, names starting with "J" which are stored in a contact application of the electronic device may be identified as the reference or references candidates. If the electronic device has learned that the user frequently makes a phone call with "Jessica", "Jessica" may be identified as the reference of "Call J".

Examples of references, references identified based on a domain is explained later by referring drawings.

In an embodiment, when characters include a noun, the reference of the characters may be a co-reference of the characters. For example, when text is obtained at an electronic device of a first user from a message received from a second user, pronoun "I" used by the second user may be a co-reference of "you" used by the first user. For example, when a message of saying "send your files" is received at the first user's electronic device from the second user, "my files" may be identified as a co-reference to "your file" at the first user's electronic device.

In an embodiment, when characters include an anaphora, antecedent of the anaphora may be identified as the reference of the characters. For example, when the obtained text is "call him", an anaphora "him" may be identified at the electronic device. If, the text is obtained in a chartroom with another user, an antecedent of the anaphora "him" may be identified based on a conversation history of the chartroom. A list of antecedent candidates is identified, and an antecedent correlated the most with the anaphora "him" in the list, for example, an antecedent having the highest non-probabilistic score may be identified as the reference of the characters.

Figure 14A:
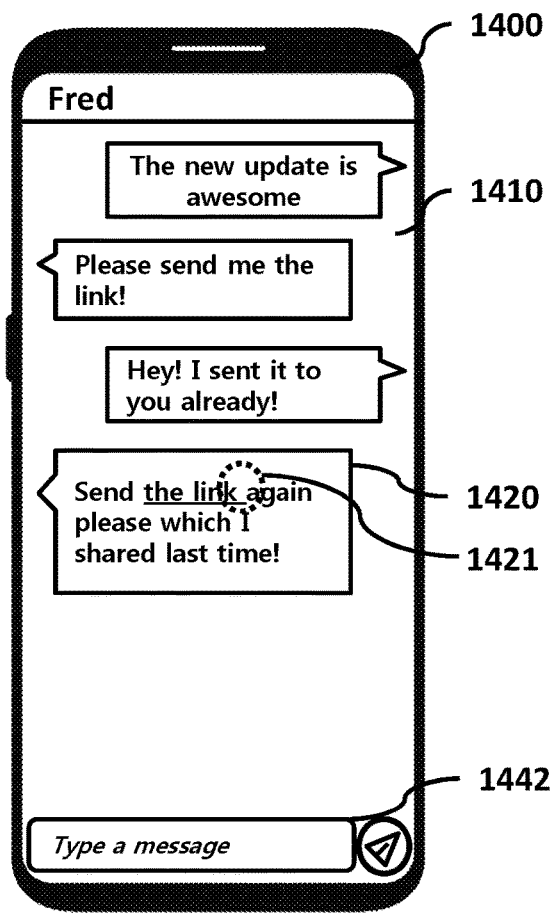
FIGS. 14A, 14B, and 14C illustrate example user interfaces for providing a contextual link to a user in a conversation as recommendations to share the contextual link with another user according to various embodiments of the disclosure.

At operation 328, the electronic device may perform, based on the identified reference, an action related to the identified domain. In an embodiment, a reference may include a hyperlink. For example, when a message saying "send the link again please which I shared last time" is received at a first user's electronic device from a second user (as illustrated in FIG. 14A), the electronic device of the first user may identify, as the reference of "the link", a hyperlink transmitted to the first user by the second user. When the reference indicate a hyperlink, an action performed based on the reference may include transmitting or sharing the hyperlink. Accordingly, when a hyperlink transmitted to the first user by the second user is identified as the reference of "the link" at the electronic device of the first user, the electronic device may perform an action of transmitting the hyperlink to the second user, or sharing the hyperlink with the second user.

In an example embodiment, a reference may include a file. For example, when a message saying "send your files" is received at a first user's electronic device from a second user (as illustrated in FIG. 11B), the electronic device of the first user may identify, as the reference of "your files", a file stored on the electronic device of the first user. When the reference indicate a file, an action performed based on the reference may include attachment, transmission, or share of the file. Accordingly, when a file stored on the electronic device of the first user is identified as the reference of "your files" at the electronic device of the first user, the electronic device may perform an action of attaching the file to a mail to the second user, transmitting the file to the second user, or sharing the file with the second user.

Figure 4A:
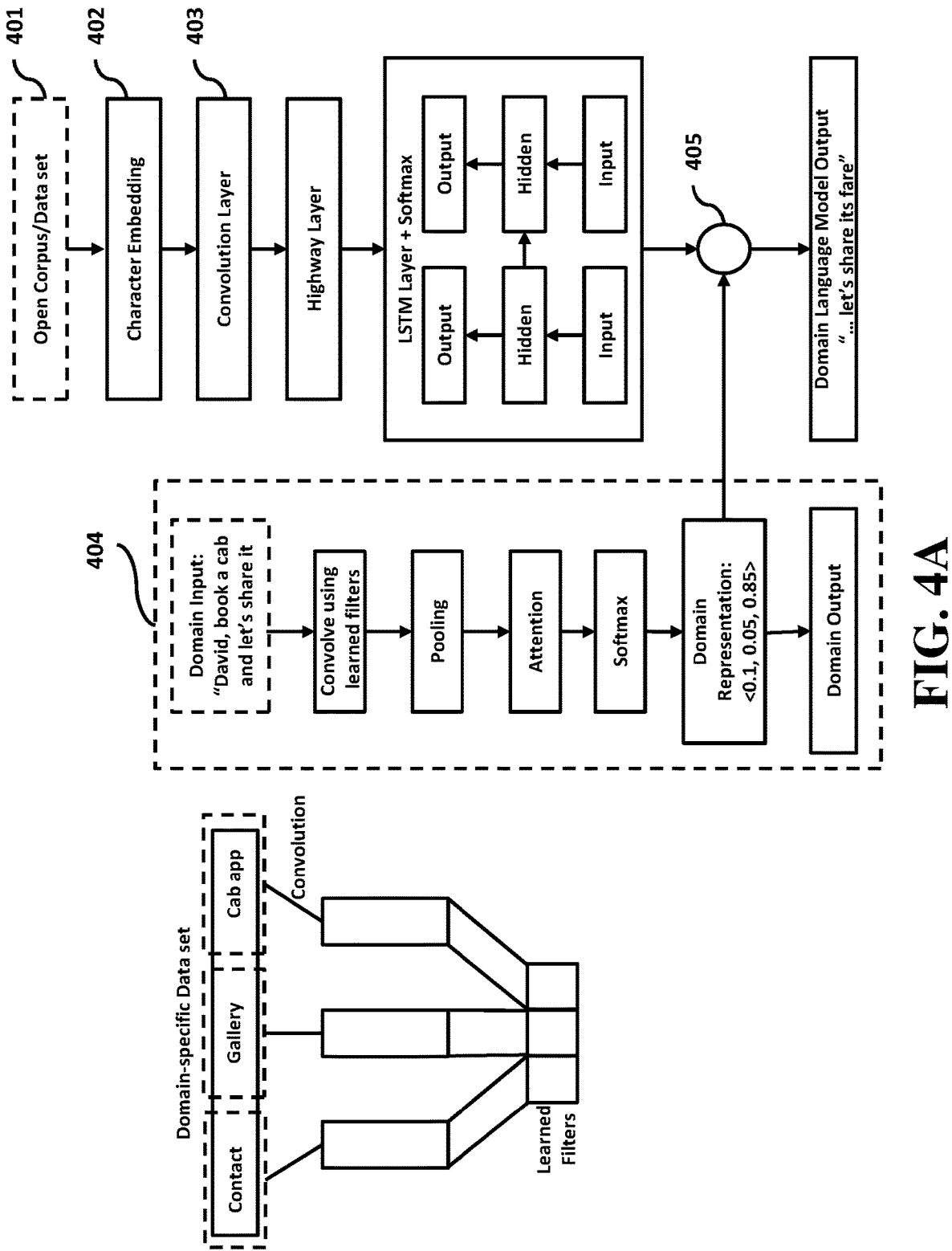
FIG. 4A is a flowchart illustrating a method of determining a domain and an object according to an embodiment of the disclosure.

FIG. 4A is a flowchart illustrating a method of determining a domain and an object according to an embodiment of the disclosure.

Figure 4B:
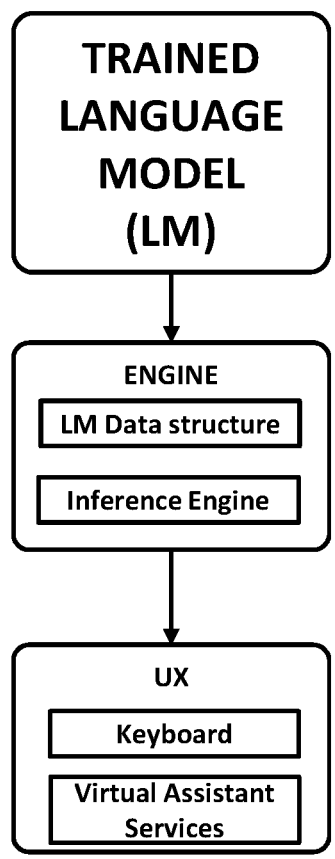
FIG. 4B is a flowchart illustrating a method of using a trained language model to determine a domain and an object according to an embodiment of the disclosure.

FIG. 4B is a flowchart illustrating a method of using a trained language model to determine a domain and an object according to an embodiment of the disclosure.

According to an embodiment, a domain and objects may be determined for a domain determined for an input provided by a user. As illustrated in FIG. 4A, at operation 401, on identifying the input provided by the user, the contextual recommendation engine 102 processes the open corpus/data-set of the trained LM model (as illustrated in FIG. 4B) considering the respective vocabulary. The trained LM model may include the data set of the domains (such as a contact application, a gallery application, a messaging application, an email application, a cab related application and so on). Examples of the data set associated with the cab related application respective with the vocabulary may be, but is not limited to, fare, cab, passenger, driver, trip and so on.

At operation 402, the contextual recommendation engine 102 provides the dataset of the trained LM to the character embedding layer. The character-embedding layer performs character processing on the received dataset and provides the processed dataset to the convolutional layer. The convolutional layer performs convolution of the input with the processed dataset and provides the convoluted output to the highway layer. The highway layer represents the processed dataset in the form of the feature vector including the floating point numbers for the dataset.

At operation 403, the contextual recommendation engine 102 passes the feature vector to the LM engine comprising of the LM data structure and the inference engine (as illustrated in FIG. 4B). The LM engine processes the feature vector using the LSTM layer and the Softmax layer and generates the hidden states representing the grammatically corrected objects related to the domains.

In an embodiment, operations 401 through 403 may be performed while operation 404 is performed. At operation 404, the contextual recommendation engine 102 determines the related domains for the input provided by the user based on the analyzed context of the input and derives the learned filters. For example, when an input provided by the user is "David, book a cab and let us share its", Based on the analyzed context of the input, the contextual recommendation engine 102 determines the related domains for the input such as, but not limited to, contact application, a gallery application, a cab related application and so on. The contextual recommendation engine 102 derives the learned filters by performing convolution of the data set associated with the related domains. The contextual recommendation engine 102 passes the convoluted output to the pooling layer, the attention layer and the Softmax layer and derives the domain representation for the related filters. The domain representation indicates the probability for the related domains. For example, the probability derived for the contact application, the gallery application and the cab related application may be 0.1, 0.5 and 0.85 respectively. Based on the probability of the related domains, the contextual recommendation engine 102 determines the cab related application as the domain for the input provided by the user.

At operation 405, the contextual recommendation engine 102 estimates the probability distribution over the grammatically related words based on the domain determined for the input. Based on the probability distribution, the contextual recommendation engine 102 derives the grammatically corrected input and the domain related objects for the input. For example, the contextual recommendation engine 102 may determine the word 'fare' as the related object for the input provided by the user. In addition, the contextual recommendation engine 102 provides the objects determined for the domain to a user experience (UX) module (as illustrated in FIG. 4B) for providing the objects as the recommendations to the user. (as illustrated in FIG. 4B) The UX module comprises of the display unit 104a/keyboard and the virtual assistant unit 106.

FIGS. 5A and 5B illustrate example user interfaces for providing recommendations to a user according to an embodiment of the disclosure.

According to an embodiment, by using the Domain-specific LM, domain-specific objects may be recommended to a user. Referring to FIG. 5A, a voice command of "Call J" may be provided to the virtual assistant 510 running on the electronic device 500. The electronic device 500 may display a lower menu-bar 502, an upper menu-bar 504, and a keypad 506. When identifying the input or voice command of the user, the contextual recommendation engine 102 may identify the domain for the input using the Domain-specific LM. In an example herein, a contact application may be determined as the domain for the input 520. Simultaneously, the contextual recommendation engine 102 determines the objects related to the domain determined for the input 520. In an example herein, contact names 530 (stored on the user device 500) that start with J (wherein a first name, second name or the third name of the contact name may start with 'J') are determined as the objects for the input 520. The contextual recommendation engine 102 may instruct the display unit 104 to display the determined contact names 530 as recommendations to the user for completing the input 520 provided by the user.

Referring to FIG. 5B, the input 522 of "share this" may be provided to the virtual assistant 510. When identifying the input 522 provided by the user, the contextual recommendation engine 102 may identify a gallery application as the domain for the input 522 using the Domain-specific LM. Further, the contextual recommendation engine 102 may recommend the objects 532 related to the domain such as, but not limited to, 'picture', 'image 532' and so on to the user for completing the input 522. The contextual recommendation engine 102 also generates the NLG (523) based on the domain determined for the input. The NLG (523) generated for the input may be "Share this picture with Jack via messaging application." Thus, the unified and improved typing experience may be provided to the user.

FIGS. 6A, 6B, 6C, 6D, 6E, and 6F illustrate example user interfaces for providing recommendations to a user according to an embodiment of the disclosure.

In an embodiment, domain-specific objects may be recommended to a user for completing at least one inputs which is provided to a virtual assistant 610 running on an electronic device 600. In an embodiment, the user may use the virtual assistant 610 to connect to IoT devices. The contextual recommendation engine 102 determines a home IoT hub as the domain for the input being provided by the user to the virtual assistant 610 using the Domain-specific LM. Further, the contextual recommendation engine 102 predicts the domain-related objects 630 such as, but not limited to, 'Dex station', 'Smart TV', 'Refrigerator' and so on. The predicted domain-related objects may be displayed to the user as suggestions for completing the input. In addition, the user may tap on the recommended domain-related objects for connecting to the corresponding IoT devices.

Figure 6A:
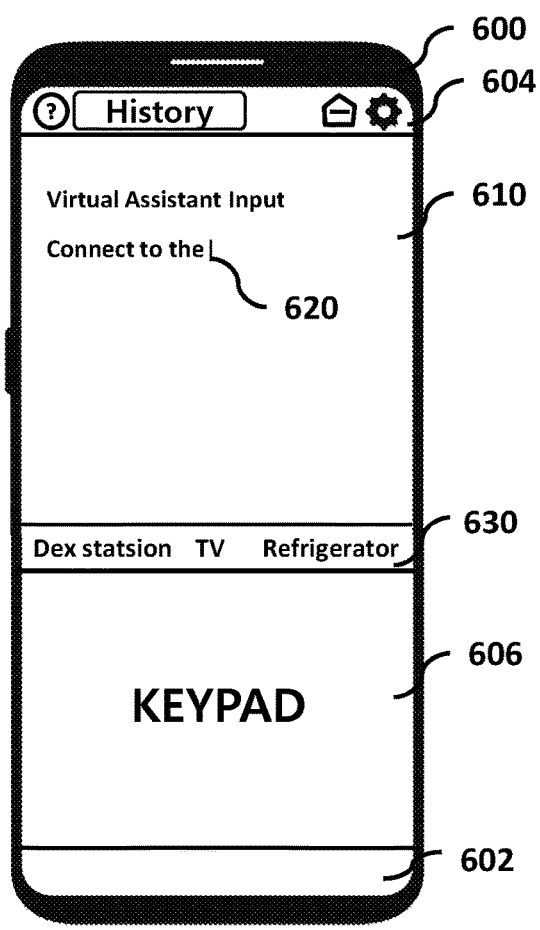
FIGS. 6A, 6B, 6C, 6D, 6E, and 6F illustrate example user interfaces for providing recommendations to a user according to various embodiments of the disclosure.
Figure 6B:
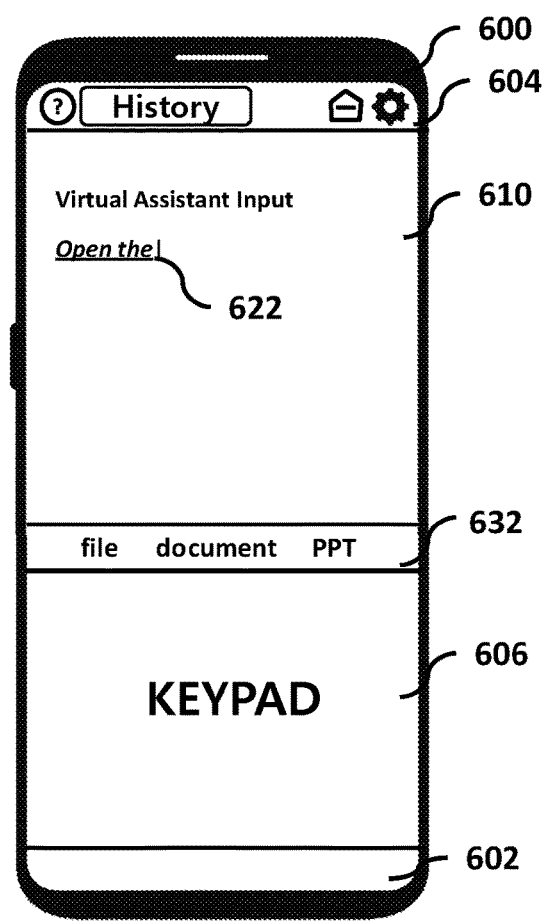

Referring to FIG. 6B, the user may use the virtual assistant 610 to open at least one of a file, a document, a PPT and so on. The contextual recommendation engine 102 determines a multimedia application as the domain using the Domain-specific LM for the input being provided by the user to the virtual assistant 610. In parallel, the contextual recommendation engine 102 determines the domain-related objects 632 such as, but not limited to, 'file', 'document', 'PPT' and so on using the Domain-specific LM. The domain-related objects 632 may be displayed to a user as input recommendations. In addition, the user may tap on the object 632 'document'/'file'/'PPT' to decipher recently downloaded or opened documents/files/PPTs. Further, the user may tap on the object 'document'/'file'/'PPT' to open the relevant documents/files/PPTs when the object 'document'/'file'/'PPT' is hyperlinked.

Figure 6C:
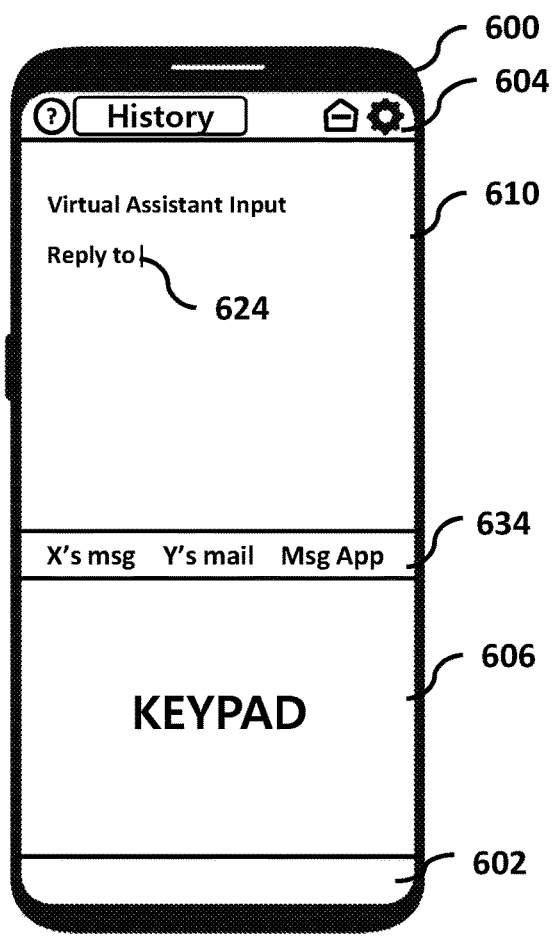

Referring to FIG. 6C, the user may use the virtual assistant 610 to reply to messages. The contextual recommendation engine 102 determines a messaging application as the domain for the input 624 being provided by the user to the virtual assistant 610. The contextual recommendation engine 102 also determines the domain related objects such as, but not limited to, 'X's Msg', 'Y's mail', 'Msg App' and so on. The domain-related objects may be displayed to the user as typing suggestions. In addition, the user may tap on any domain related objects to decipher whom to reply.

Figure 6D:
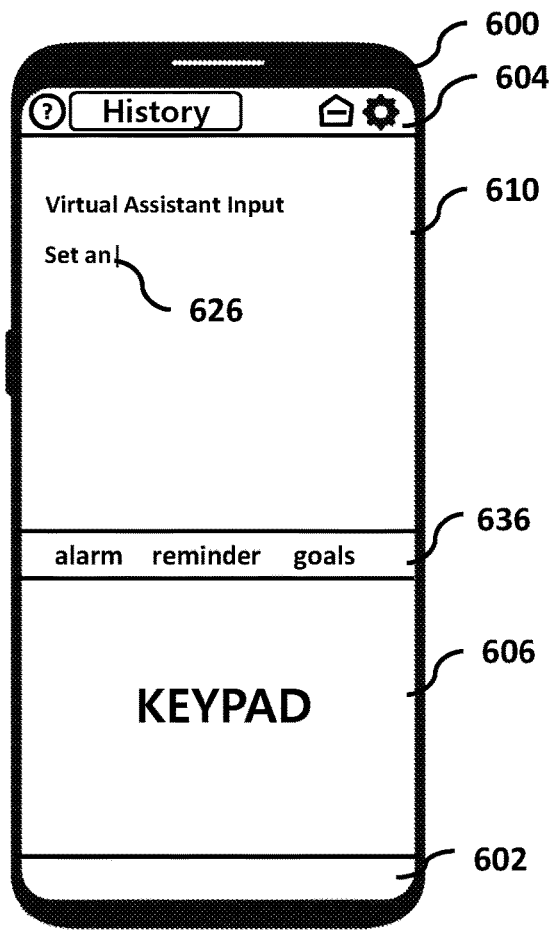

Referring to FIG. 6D, the user may use virtual assistant 610 to perform actions related to a clock or a calendar domain. The contextual recommendation engine 102 determines a clock/calendar application as the domain using the Domain-specific LM for the input 624 being provided by the user to the virtual assistant 610. The contextual recommendation engine 102 predicts the objects 636 such as, but not the limited to, 'alarm', 'remainder', 'goals' and so on as related to the domain and displays such objects 636 as recommendations to the user. The predicted objects 636 may be hyperlinked. The user may tap on the objects 636 to open a corresponding application.

Figure 6E:
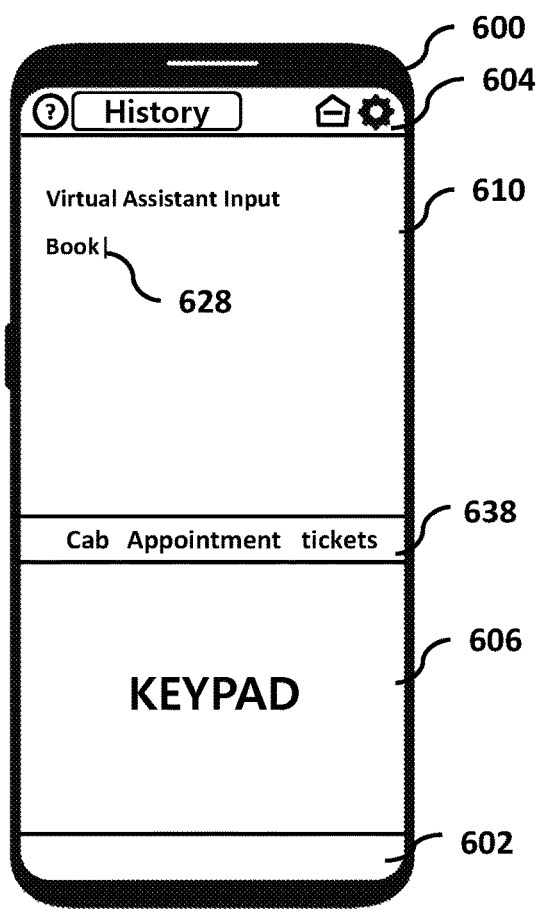

Referring to FIG. 6E, a user may use the virtual assistant 610 and provide a voice command as 'Book' 628. The contextual recommendation engine 102 determines multiple domains for the input 628 using the Domain-specific LM. The multiple domains determined for the input 628 may be, but not limited, to, a cab related application, a flight related application, a movie booking related application, a doctor appointment booking related application and so on. In parallel, the contextual recommendation engine 102 determines the objects related to the multiple domains using the Domain-specific LM and displays the determined objects to the user as the recommendations. The determined objects 638 for the multiple domains may be, but is not limited to, 'cab/flight', 'appointment', 'movie tickets' and so on. In addition, the user may tap on the recommended objects to perform the intended action associated with those objects.

Figure 6F:
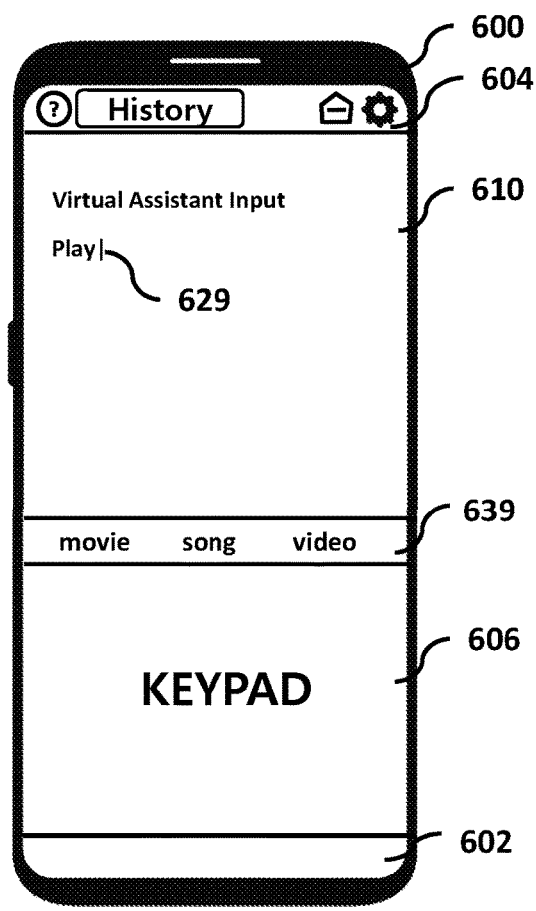

Referring to FIG. 6F, a user may use the virtual assistant 610 and provide a voice command as 'Play'. The contextual recommendation engine 102 determines multiple domains for the input 629 using the Domain-specific LM. The multiple domains determined for the input may be, but not limited, to, an audio/music application, a video application and so on. In parallel, the contextual recommendation engine 102 determines the objects 639 related to the multiple domains using the Domain-specific LM and displays the determined objects 639 to the user as recommendations. The determined objects 639 for the multiple domains may be, but not limited to, 'movie', 'song', and 'video' and so on. In addition, the user may tap on the recommended objects 639 to download the relevant movie/song/video.

Figure 7A:
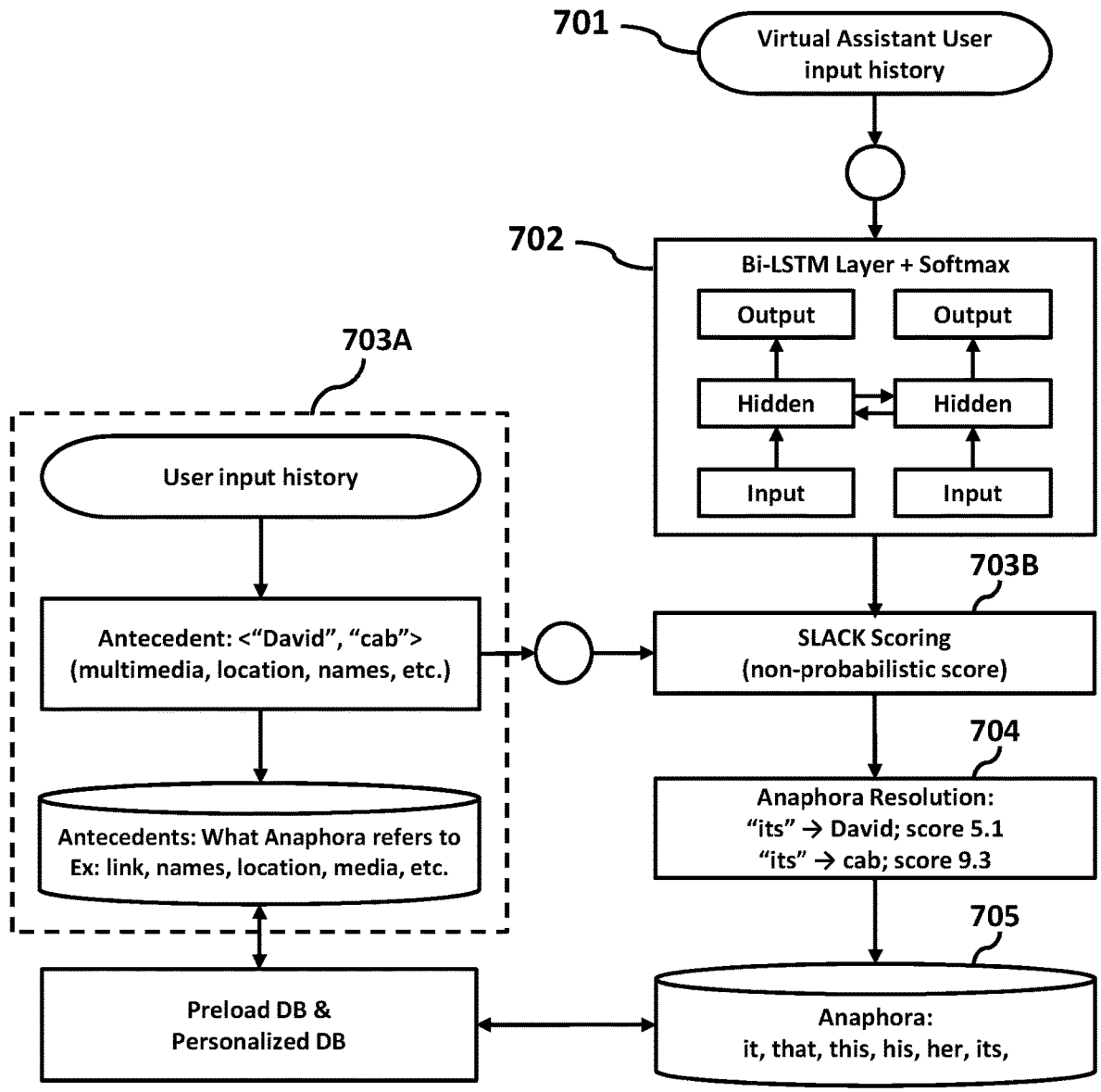
FIG. 7A is a flowchart illustrating a method of determining a co-reference according to an embodiment of the disclosure.

FIG. 7A is a flowchart illustrating a method of determining a co-reference according to an embodiment of the disclosure.

Figure 7B:
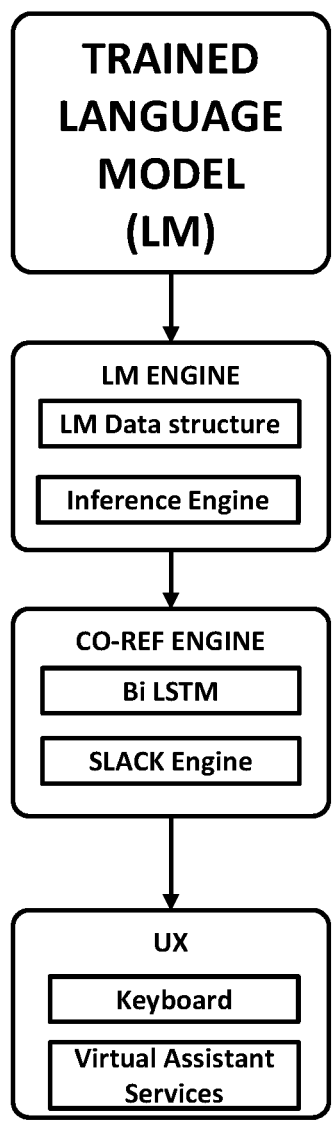
FIG. 7B is a flowchart illustrating a method of using a trained language model to determine a co-reference according to an embodiment of the disclosure.

FIG. 7B is a flowchart illustrating a method of using a trained language model to determine a co-reference according to an embodiment of the disclosure.

Referring to FIG. 7A, at operation 701, the contextual recommendation engine 102 accesses the local database 118 to obtain the user input history and represents the user input history in the form of the feature vector of floating point numbers.

At operation 702, the contextual recommendation engine 102 passes the feature vector to the both in a forward direction and a backward direction through the Bi-LSTM layer and the Softmax layer of the LM engine. The LM engine comprises of the LM data structure and the inference engine as illustrated in FIG. 7B.

At operation 703A, the contextual recommendation engine 102 determines the antecedent list present in the user input history. The contextual recommendation engine 102 adds the determined antecedent list to the antecedent database. In an example herein, contextual recommendation engine 102 determines noun phrases such as, David and cab as antecedents using the NLP techniques for the user input history.

At operation 703B, the contextual recommendation engine 102 feeds the output of the Bi-LSTM layer and the Softmax layer of the LM engine, the domain identified for the input and the antecedents list to the co-reference engine (as illustrated in FIG. 7B). The SLACK engine of the co-reference engine calculates the non-probabilistic scores to the antecedent list based on the domain determined for the input. For example, the scores calculated for 'David' and 'cab' may be 5.1 and 9.3 respectively. The contextual recommendation engine 102 may determine the antecedent 'cab' as the co-reference for the domain determined for the input and provide the visual cue for the co-reference 'cab'. A co-reference 'cab' of the characters 'its' may be a reference of the characters 'its.' The reference of the charters 'its' may be words related to 'cab', for example, fare, seats, distance, but are not limited thereto. The output of the co-reference engine (the co-reference and the visual cue) may be provided to the UX module comprising of the display unit 104/keyboard and the virtual assistant unit 106 (as illustrated in FIG. 7B). The visual cue may be displayed to the user as the recommendation. The user may perform the gesture (the tap action) on the visual cue to access the relevant cab related actions.

At operation 704, in case of presence of the antecedents and anaphors in the input, the contextual recommendation engine 102 performs the anaphora resolution to relate the anaphora present in the input with the antecedent of the antecedent list having the highest score. For example, the contextual recommendation engine 102 determines 'its' as the anaphora present in the input. The contextual recommendation engine 102 relates the antecedent 'cab' with the anaphora 'its', since the domain determined for input is the cab related application. The contextual recommendation engine 102 determines the linked anaphor 'its' with the antecedent 'cab' as the co-reference for the domain determined for the input. At operation 705, the contextual recommendation engine 102 adds the anaphor 'its' to the anaphora database.

Figure 8:
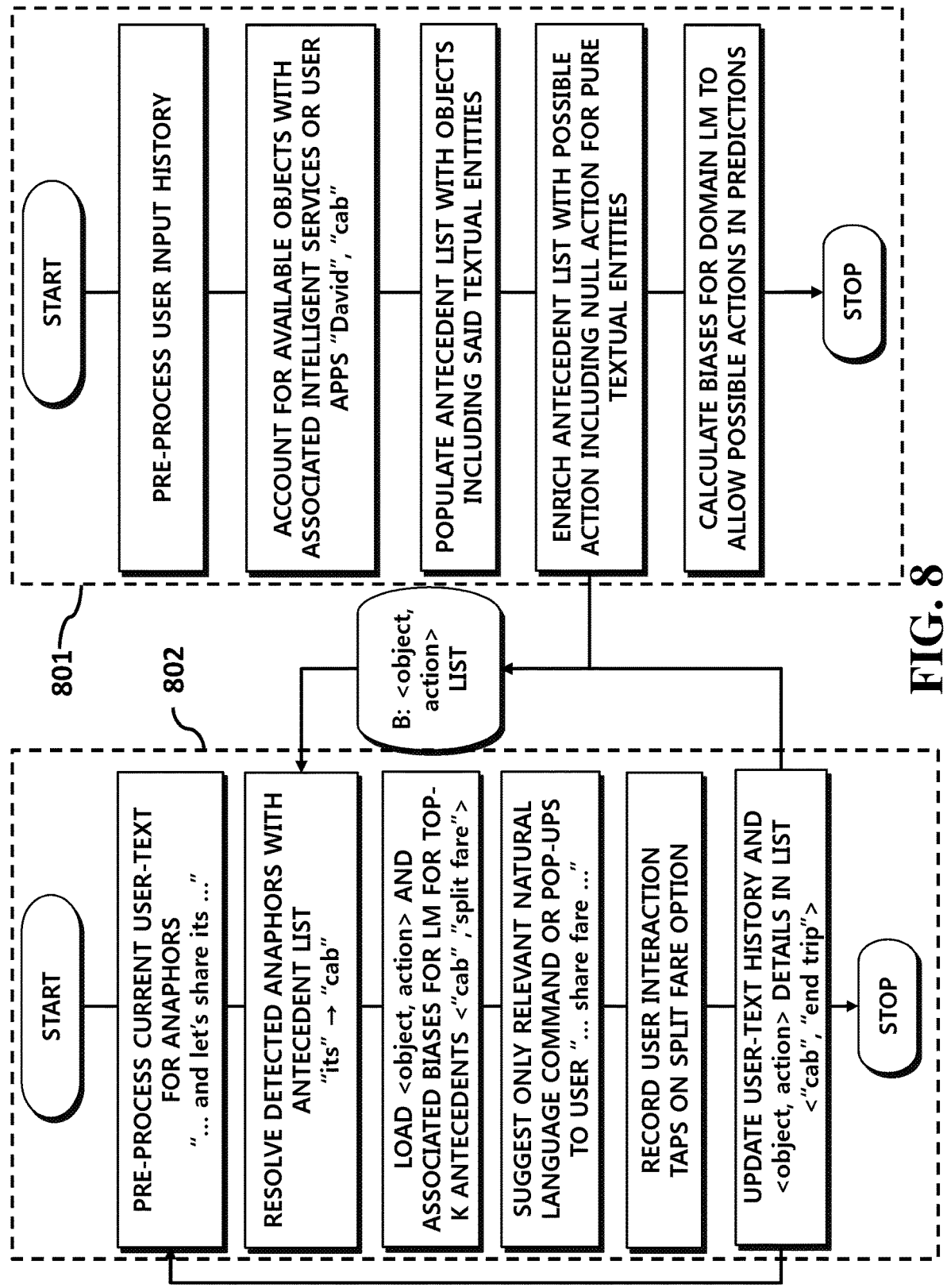
FIG. 8 is a flowchart illustrating a method of providing recommendations to a user by resolving a co-reference according to an embodiment of the disclosure.

FIG. 8 is a flowchart illustrating a method of providing recommendations to a user by resolving a co-reference according to an embodiment of the disclosure.

At operation 801, the contextual recommendation engine 102 processes the user input history and determines the objects available for the domain determined for the input. For example, the objects such as 'fare', 'cab', 'passenger', 'driver', 'trip' and so on may be the available objects for the cab related application (the domain). The objects such as 'pies', 'HDR', 'filters', 'videos' and so on may be the available objects for the multimedia application (the domain). The contextual recommendation engine 102 populates the antecedent list with the objects available for the domain including textual entities. For example, the contextual recommendation engine 102 may populate the antecedent 'cab' with the object 'fare', since the object 'fare' is having the highest score. The contextual recommendation engine 102 determines the possible actions for the objects or the functions of the objects and relates the antecedent list with the possible actions. The actions may include null actions for the textual entities. Further, the contextual recommendation engine 102 calculates the biases/weights for the Domain-specific LM to allow the possible actions in the predictions/objects. The contextual recommendation engine 102 adds the objects and the corresponding actions populated for the antecedent list and the associated biases for the Domain-specific LM to the object-action list database. For example, the contextual recommendation engine 102 populates the antecedent 'cab' with the object 'fare' and the corresponding action 'split fare' (shows the fare) and adds the object-action determined for the antecedent 'fare' to the object-action list database.

At operation 802, the contextual recommendation engine 102 resolves the co-reference based on the determined domain for the input, the co-reference resolution and the biased domain LM. The contextual recommendation engine 102 resolves the co-reference by accessing the object-action database list to load the objects, the corresponding actions and the associated biases for the Domain-specific LM for the top-K antecedents of the antecedent list. In an example herein, the co-reference may be the anaphor 'its' linked with the antecedent 'cab'. The contextual recommendation engine 102 resolves the co-reference by checking the object-action list database to determine the object and the corresponding action for the antecedent 'cab'. In an embodiment, 'fare' may be determined as an object, 'split fare' may be determined as an action related to the domain. The contextual recommendation engine 102 recommends the object 'fare' to the user for the completion of the input. When the user performs any gesture on the object 'fare', the fare may be shown to the user.

When an input of "Heat dinner and set it to" is provided by a user, the contextual recommendation engine 102 determines the home hub IoT as the domain for the input. Further, the contextual recommendation engine 102 determines 'smart oven' as the antecedent for the input based on the domain identified for the input and the user input history. The contextual recommendation engine 102 relates the antecedent 'smart oven' with the anaphor 'it' and considers the detected anaphor 'it' with the antecedent 'smart oven' as the co-reference. The contextual recommendation engine 102 resolves the co-reference by determining the object and the corresponding action for the co-reference using the object-action database. In an example herein, the object 'defrost' may be determined for the co-reference and displays the object 'defrost' as recommendation to the user.

FIG. 9 is an example table for explaining difference between recommendations provided, and recommendations provided by existing systems according to an embodiment of the disclosure.

The recommendations may be determined based on a domain determined for an input, co-reference resolution, and biased Domain-specific LM according to an embodiment. The recommendations provided by existing systems for different sentences being typed by the user is illustrated in the example table. However, the recommendations provided by the existing systems may be generic and default predictions, which do not target the end user's preferences.

In contrast, the recommendations provided by the contextual recommendation engine 102 are based on at least one of the domain determined for the input, the performed co-reference resolution and the biased Domain-specific LM. According to an embodiment, the unified and improved typing experience may be provided to the user.

Figure 10C:
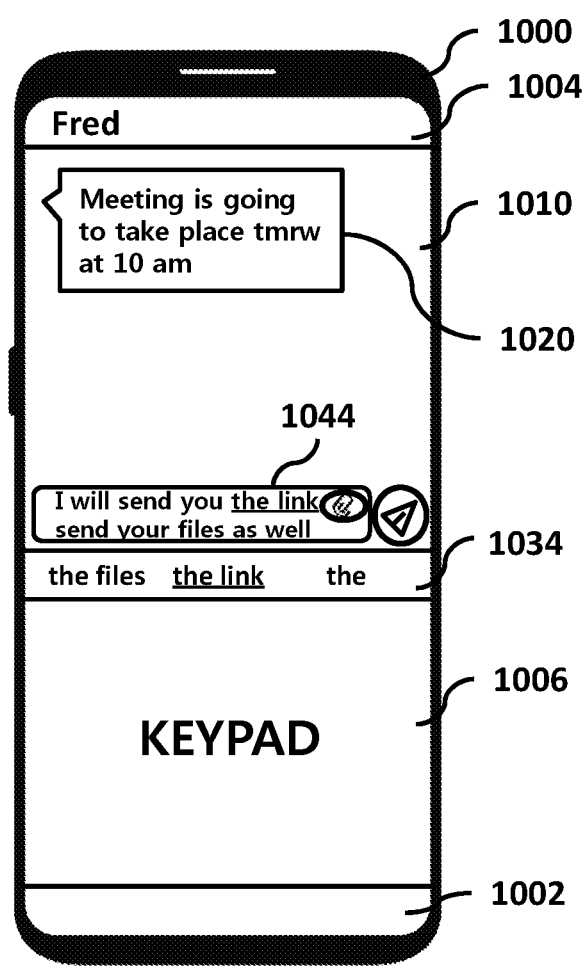

FIGS. 10A, 10B, and 10C illustrate example user interfaces for providing contextual links to a user as recommendations according to an embodiment of the disclosure.

Referring to FIG. 10A, a message 1020 about a scheduled meeting may be received at a messaging application 1010 of an electronic device 1000, and a user may type "I will send you" 1040 into the electronic device 1000. The contextual recommendation engine 102 identifies the multimedia applications as the domain for the input 1040 using the domain-specific LM and determines domain-related objects 1030 such as 'the files', 'the links' and so on for the input 1040. The contextual recommendation engine 102 instructs the display unit 104 to display the domain-related objects 1030 on the virtual keyboard as the recommendations to the user for completing the input 1040. Further, the user may select the object 'the link'.

Referring to FIG. 10B, when it is determined that a user tap on the object 'the link', the contextual recommendation engine 102 may determine 'the link' as the antecedent based on the domain determined for the input and the user input history. Specifically, the contextual recommendation engine 102 determines a hyperlink 1051 indicated by 'the link', and provides the visual cue (underlined the object 'the link') to refer to access 'the link' (1051). When the user taps on the object 'the link' 1031, the contextual recommendation engine 102 resolves the co-reference. For resolving the co-reference, the contextual recommendation engine 102 checks the object-action database list and determines contextual links related to the scheduled meeting as object for the antecedent 'the link' and displaying the contextual links 1050 as the action for the antecedent 'the link'. The contextual links may be displayed to the user as recommendations. The contextual links herein may refer to any meeting related links stored on at least one of a local device, a server, a cloud and so on.

Referring to FIG. 10C, if the user selects any one of the recommended contextual links, the contextual recommendation engine 102 attaches the selected link to the message 1044 for sending to a recipient.

Figure 11A:
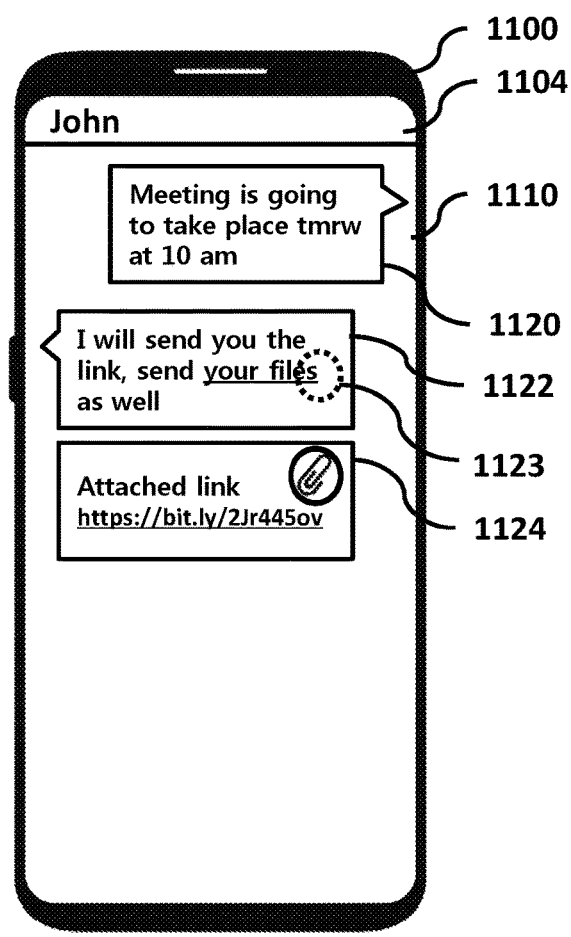
FIGS. 11A and 11B illustrate example user interfaces for providing a file to a user as recommendations according to various embodiments of the disclosure.
Figure 11B:
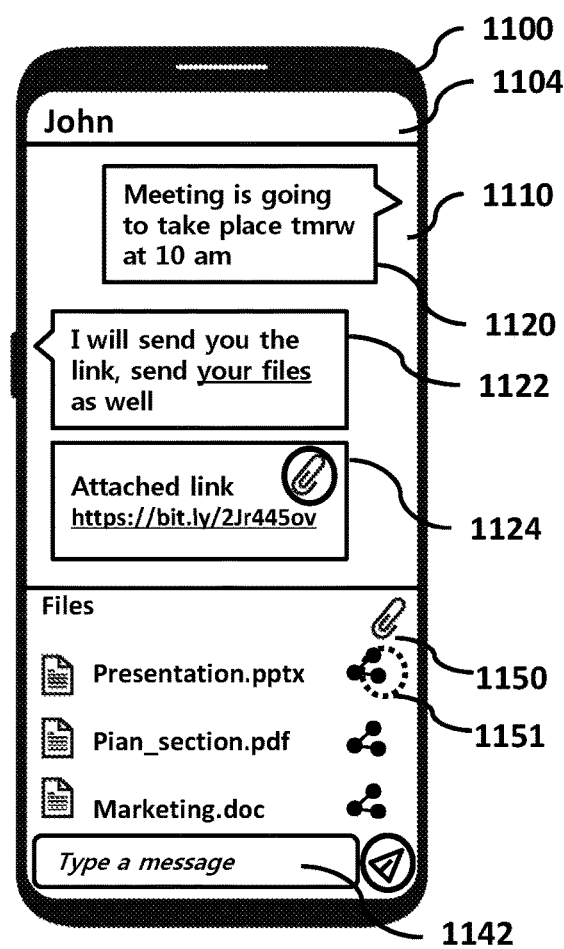

FIGS. 11A and 11B illustrate example user interfaces for providing a file to a user as recommendations according to an embodiment of the disclosure.

Referring to FIG. 11A, an electronic device 1100 may receive a message 1022 including an attached link 1024. Further, the message 1022 may include characters 'your files' 1023, a reference of 'your files' 1023 may include files stored on the electronic device 1100. A co-reference of the characters 1023 may be the reference of the characters 1023, the contextual recommendation engine 102 determines the 'your files 1023' as the co-reference and provides the visual cue for the 'your files 1023' to access the referred files 1150. For example, a visual cue may include underlining 'your files' in the message 1122.

As illustrated in FIG. 11B, if the user selects the 'your files' in the message 1122, the contextual recommendation engine 102 accesses the object-action database list and determines the files 1150 for the antecedent 'files' related to the scheduled meeting. The contextual recommendation engine 102 recommends the files 1150 related to the scheduled meeting and enables a share option 1151 for the user to share the files with others. The files 1150 related to the meeting may present on the user's device 1100.

Figure 12A:
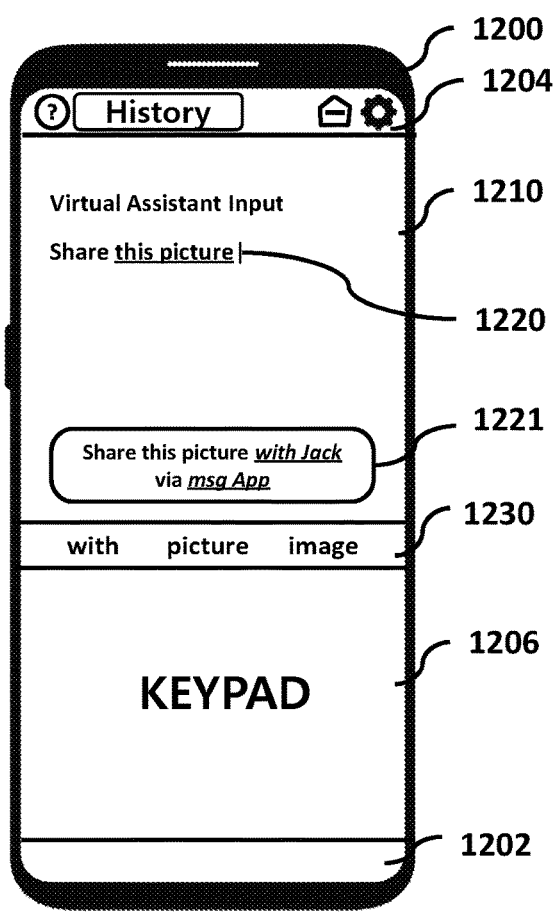
FIGS. 12A and 12B illustrate example user interface for providing an image to a user as recommendations according to an embodiment of the disclosure.
Figure 12B:
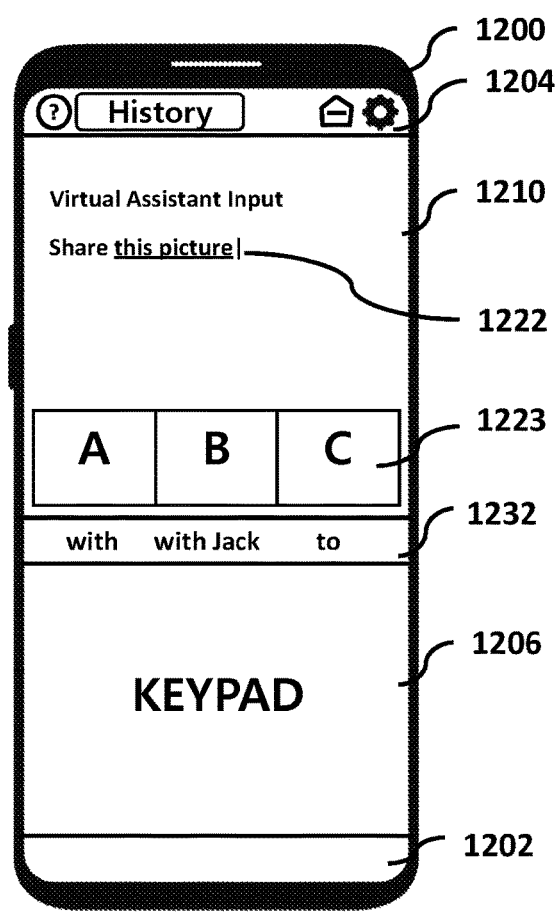

FIGS. 12A and 12B illustrate example user interface for providing an image to a user as recommendations according to an embodiment of the disclosure.

According to an embodiment, a picture or an image may be recommended to a user based on a voice command 1120) being provided to the virtual assistant 1120. Referring to FIG. 12A, the user may provide the voice command as "share this picture" 1220 to the virtual assistant unit 106. When identifying the input 1220 provided by the user, the contextual recommendation engine 102 determines a contact application as the domain for the input and determines the domain related object as 'with Jack' (operation 2) using the Domain-specific LM model. The contextual recommendation engine 102 instructs the display unit 104 to display the object "with Jack' on the virtual keyboard displayed on the display screen as typing suggestions for the input. Further, the contextual recommendation unit 102 may generate the NLG 1221 as "share this picture with Jack via Msg App." In addition, the contextual recommendation unit 102 understands the generated NLG 1221 and resolves the co-reference (resolves the anaphora 'this' linked with the antecedent 'picture') to provide the visual cue for the co-reference "this picture" of the input. The visual cue (underlined string ("this picture")) may be provided for the user to access images or pictures from the gallery application.

Referring to FIG. 12B, if the user performs any action (a tap action) on the visual cue 1222, the contextual recommendation engine 102 access the obj ect-action database and determines the object (the pictures associated with Jack) and the actions (displaying the pictures associated with Jack on the display screen) for the antecedent 'picture'. The contextual recommendation engine 102 access the pictures 1223 associated with Jack from the gallery application and provided as recommendations to the user (operation 5). Thus, the user may select at least one picture among the accessed pictures 1223 for sharing with Jack.

Figure 13:
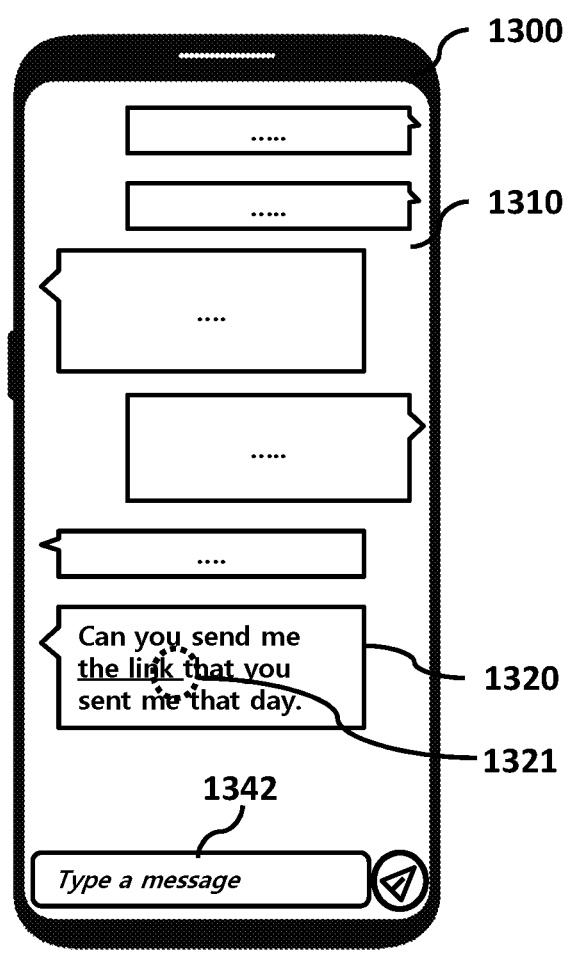
FIG. 13 illustrates an example user interface for providing a contextual link to a user in a conversation as recommendations according to an embodiment of the disclosure.

FIG. 13 illustrate an example user interface for providing a contextual link to a user in a conversation as recommendations according to an embodiment of the disclosure.

The electronic device 1300 may receive at a messaging application 1310 a message 1320 from another user, the messaging saying resend of the link. When determining that the user interaction with the messaging application, the contextual recommendation engine 102 understands the received message (NLG) and links the detected antecedent 'the link' with the anaphora 'that day'. Further, the contextual recommendation engine 102 provides the visual cue 1321 for the word 'the link' to access the content of the link. When the user performs gesture on the visual cue 1321, the contextual recommendation engine 102 accesses the object-action list database and determines the object and action for the antecedent 'the link'. The determined object for the antecedent link may be a video link and the action may be enabling of an auto-scroll feature. For example, based on selection of 'the link' 1321, a screen of the electronic device 1300 may auto-scrolled to a location where a corresponding video link is shared in a chatroom. The contextual recommendation engine 102 enables the auto-scroll feature present in the electronic device 100 that automatically scrolls user conversations and takes the user to respective location that contains the required video link. Thus, the user may find the previously shared video link by tapping on the visual cue 1321. In addition, the contextual recommendation engine attaches the link to the message by generating the NLG in a message input filed 1342 and shares the message including the attachment with another user automatically.

Figure 14B:
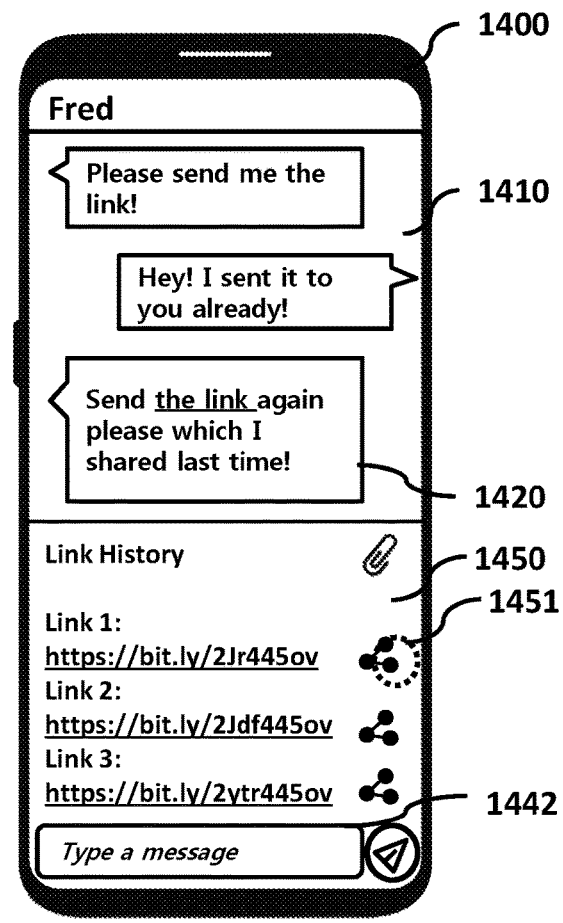
Figure 14C:
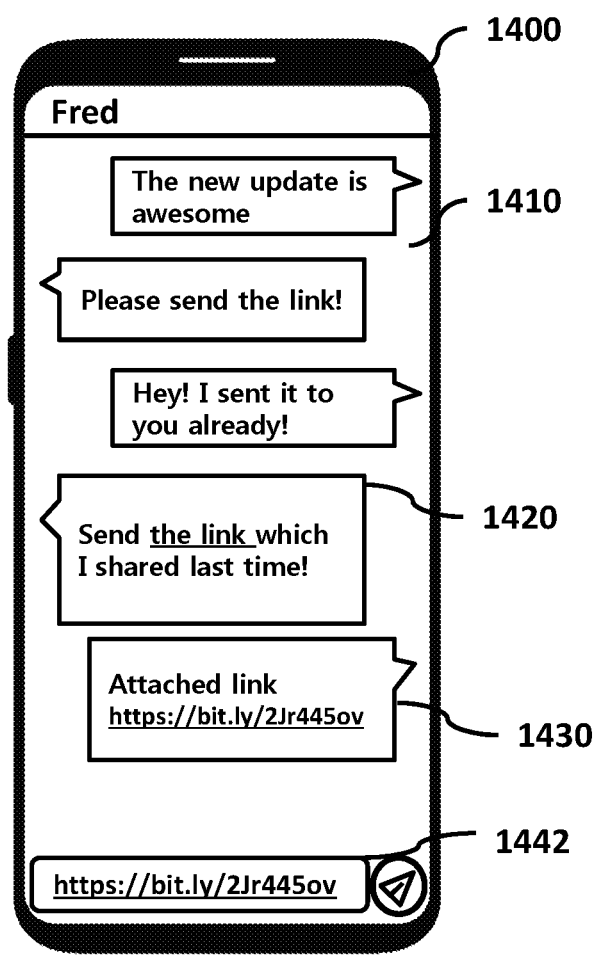

FIGS. 14A, 14B, and 14C illustrate example user interfaces for providing a contextual link to a user in a conversation as recommendations to share the contextual link with another user according to an embodiment of the disclosure.

Referring to FIGS. 14A, 14B, and 14C, the electronic device 1400 may receive a message 1420 saying resend of a previous link shared by another user the last time, through a messaging application 1410. When determining the user interaction with the messaging application 1410, the contextual recommendation engine 102 understands the received message 1420 which is in the form of the NLG, links the antecedent 'the link' with the anaphor 'last time' (the co-reference) and provides the visual cue 1421 for the antecedent 'the link'.

When the user performs any gesture on the visual cue 1421 as illustrated in FIG. 14B, the contextual recommendation engine 102 resolves the co-reference by identifying the links 1450, which were received by the user from another user last time. Further, the contextual recommendation engine 102 displays the identified links 1450 to the user.

When the user selects one link 1451 of the displayed links 1450, the contextual recommendation engine 102 attaches the selected link to the message 1430 for sharing with another user as illustrated in FIG. 14C.

Figure 15A:
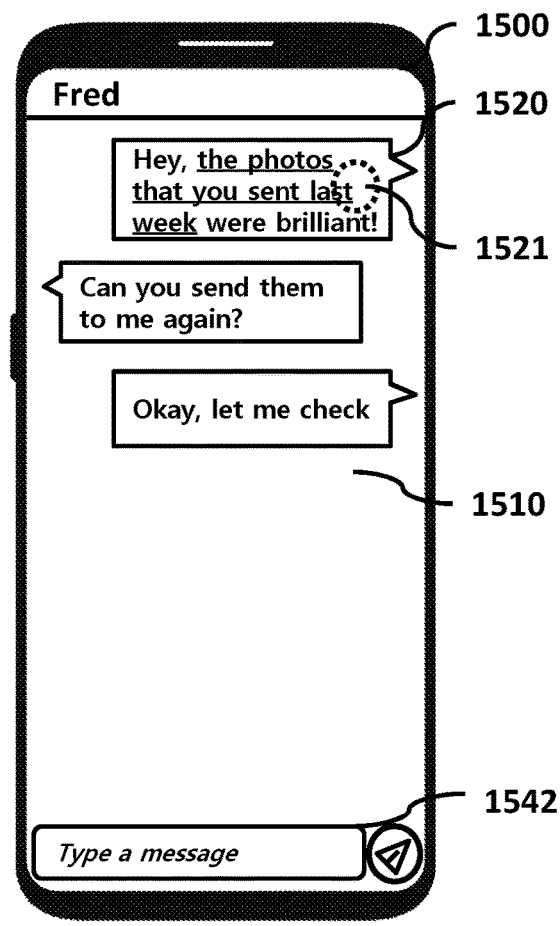
FIGS. 15A, 15B, and 15C illustrate example user interfaces for providing an image to a user in a conversation as recommendations according to various embodiments of the disclosure.
Figure 15B:
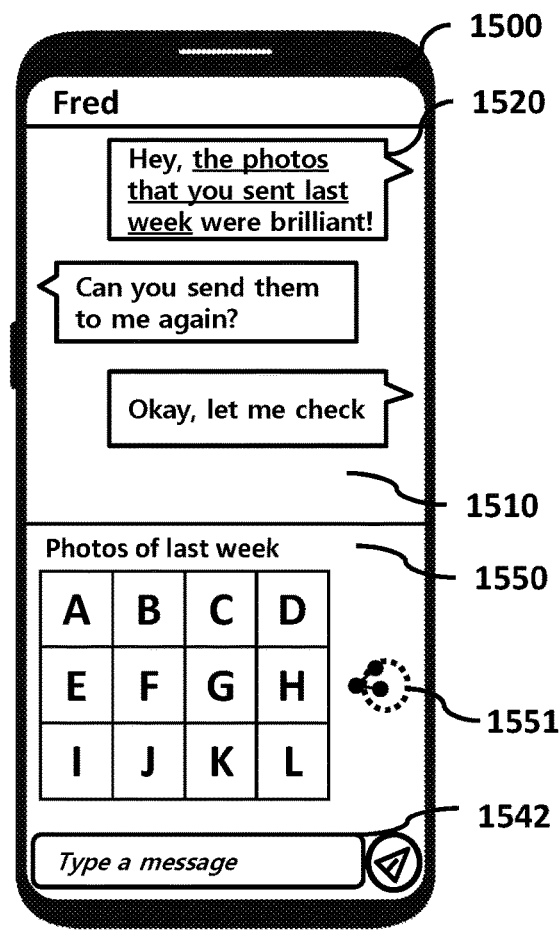
Figure 15C:
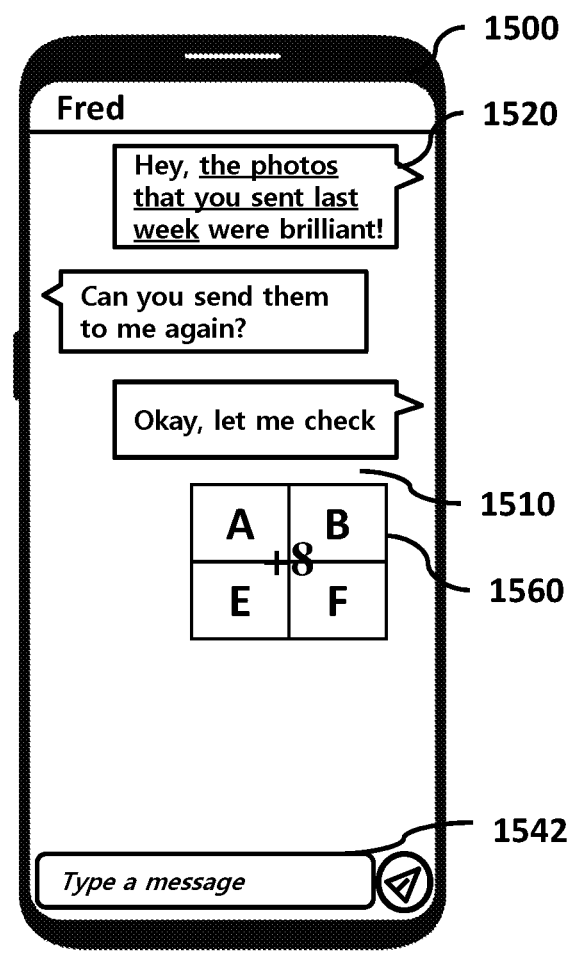

FIGS. 15A, 15B, and 15C illustrate example user interfaces for providing an image to a user in a conversation as recommendations according to an embodiment of the disclosure.

An image may be recommended to a user based on co-reference resolution according to an embodiment. Referring to FIG. 15A, the electronic device 1500 may receive through a messaging application 1510 a message of a request of sending pictures shared last time.

Referring to FIG. 15A, the contextual recommendation engine 102 understands the message, links/co-relates the antecedent 'the photos' with the anaphor 'last week' (the co-reference) and provides the visual cue 1521 to access the relevant photos. The visual may be indicated by the underlined phrase "photos that you sent last week." When the user performs any gestures on the visual cue 1521, the contextual recommendation engine 102 resolves the co-reference based on the domain identified for the input, the co-reference resolution and the biased Domain-specific LM model and identifies the relevant photos 1550 to share with another user. The contextual recommendation engine 102 instructs the display unit 104 to display the identified photos 1550 to the user as recommendations.

Referring to FIG. 15B, when the user selects at least one displayed photo, the contextual recommendation engine 102 provides an option 1551 to share with another user may be provided to a user. Referring to FIG. 15C, based on selection of the option 1551, pictures 1560 may be shared with another user.

Figure 16A:
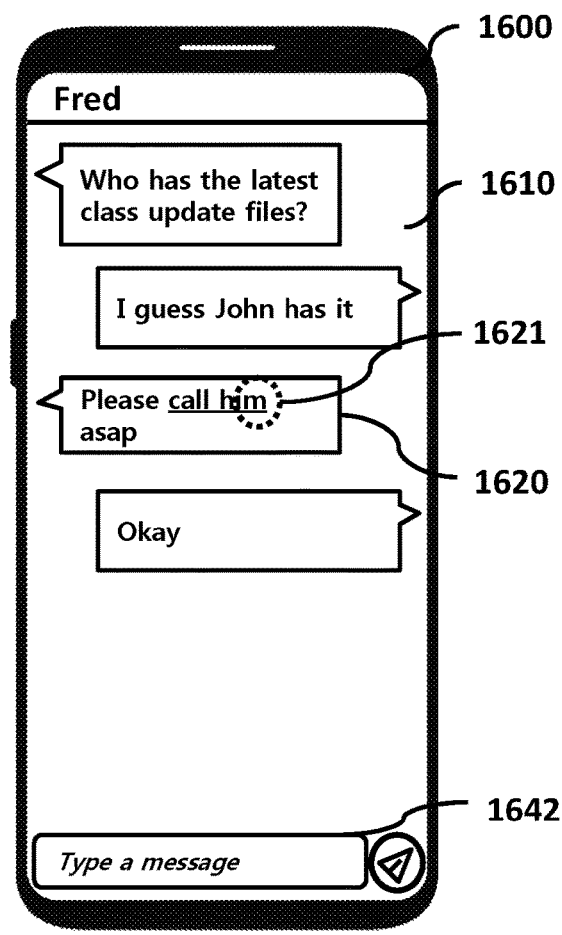
FIGS. 16A, 16B, and 16C illustrate example user interfaces for providing a contact card to a user in a conversation as recommendations according to various embodiments of the disclosure.
Figure 16B:
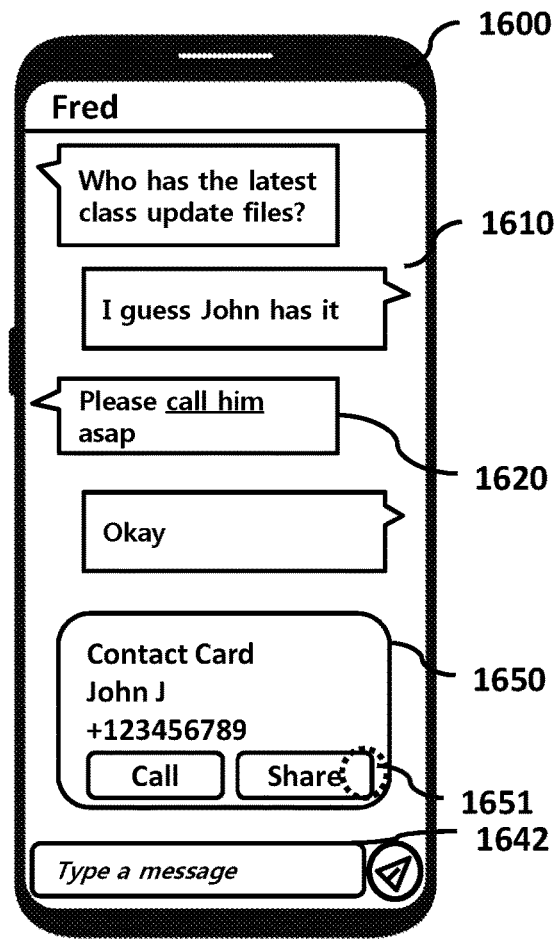
Figure 16C:
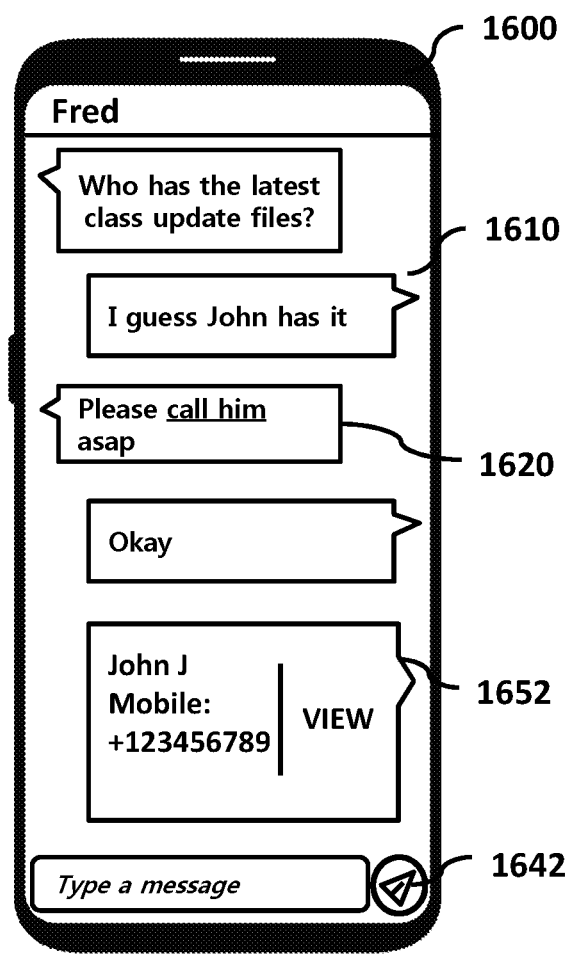

FIGS. 16A, 16B, and 16C illustrate example user interfaces for providing a contact card to a user in a conversation as recommendations according to an embodiment of the disclosure.

According to an embodiment, a contact card may be recommended to a user based on co-reference resolution. Referring to FIG. 16A, the electronic device 1600 may receive a message 1620 to call someone who has the latest class update file.

Referring to FIG. 16B, the contextual recommendation engine 102 analyzes the message, links the antecedent 'John' with the anaphor 'him' (the co-reference) and provides the visual cue 1621 to access a contact number of John. The visual cue may be indicated by an underlined word "call him". When the user performs any gesture on the visual cue 1621, the contextual recommendation engine 102 resolves the co-reference based on the domain identified for the input, the co-reference resolution and the biased domain LM model and identifies the contact number of 'John'. Further, as illustrated in FIG. 16B, the contextual recommendation engine 102 instructs the display unit 104 to display the contact number/contact card 1650 of John to the user as the recommendation. In addition, the contextual recommendation engine 102 may provide a call option and a share option 1651 for the contact card 1650. Thus, the user may quickly call or share the contact card with another user.

Referring to 16C, when the user selects the share option 1651, the contextual recommendation engine 102 attaches the contact card 1652 to the message. Thus, the user may quickly share the contact card with another user.

FIGS. 17A, 17B, 17C, and 17D illustrate example user interfaces for providing a contextual recommendation to a user according to an embodiment of the disclosure.

In an embodiment, based on domain-specific language model prediction and performed co-reference resolution, a contextual recommendation may be provided to a user.

Figure 17A:
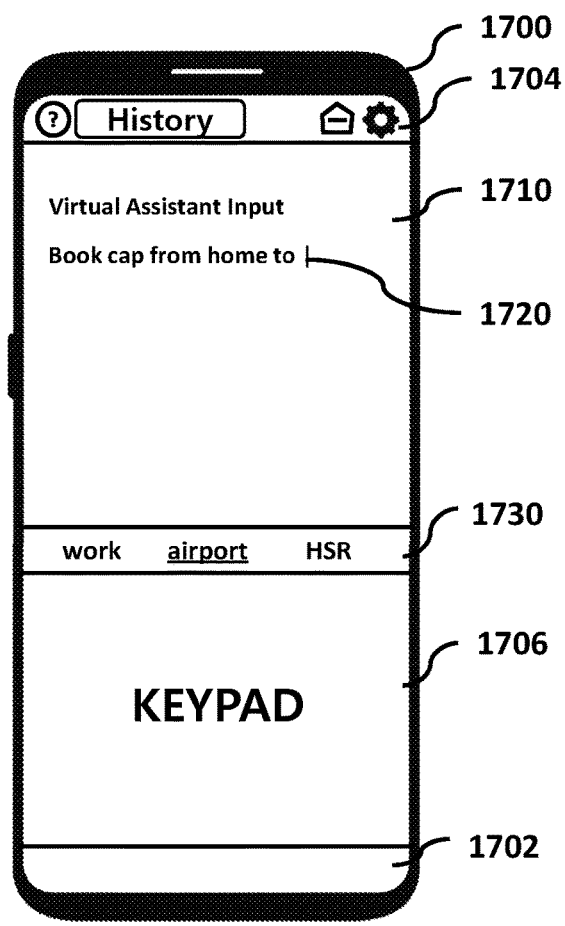
FIGS. 17A, 17B, 17C, and 17D illustrate example user interfaces for providing a contextual recommendation to a user according to various embodiments of the disclosure.

Referring to FIG. 17A, a user may book a cab via a virtual assistant 1710 running on the electronic device 1700. The contextual recommendation engine 102 analyzes the input 1720 being provided by the user and uses the Domain-specific LM for recommending location related objects 1730 such as, but not limited to, 'work', 'airport', 'HSR' and so on to the user for completing the input 1720. The contextual recommendation engine builds 'work' reference antecedent as user work location based on the previous inputs provided by the user and provides the location related objects as the co-references. When the user taps on the recommended location related objects, the contextual recommendation engine 102 resolves the co-references and allows the user to view the time taken to reach that location (on which the user is tapped) from his home.

Figure 17B:
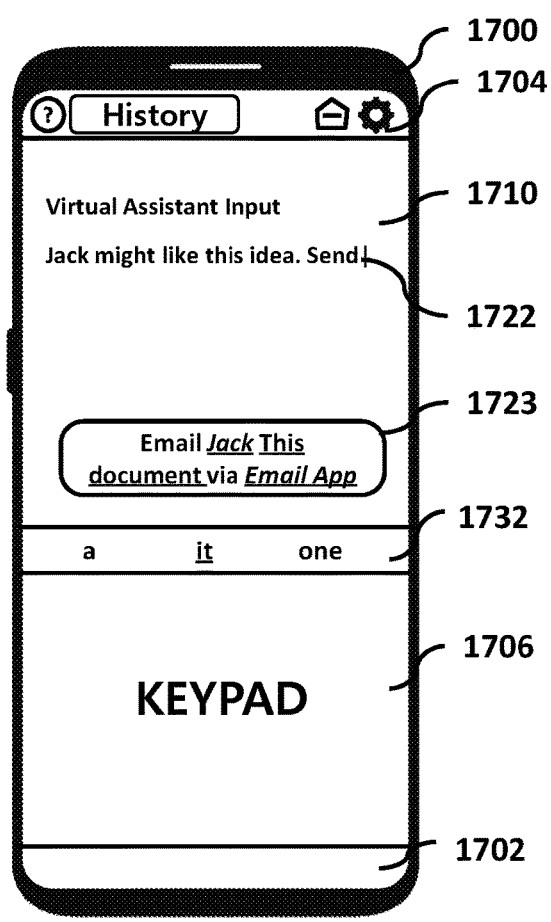

Referring to FIG. 17B, the user may use the virtual assistant 1710 to enter text. The contextual recommendation engine 102 analyzes the input being provided by the user to the virtual assistant 1710 and uses the Domain-specific LM for recommending the objects 1723 such as, but not limited to, 'a', 'it', 'one' and so on. Further, the contextual recommendation engine 102 may uses cues from the domain identified for the input and provides the relevant document as co-reference for the anaphor 'it'. In addition, based on the identified co-reference (the antecedent 'document'), the contextual recommendation engine 102 generates the NLG 1723 as "Email Jack this document via Email App". When the user performs any gesture on the co-reference (this document'), the contextual recommendation engine 102 resolves the co-reference by attaching the document to the email for sharing with Jack.

Figure 17C:
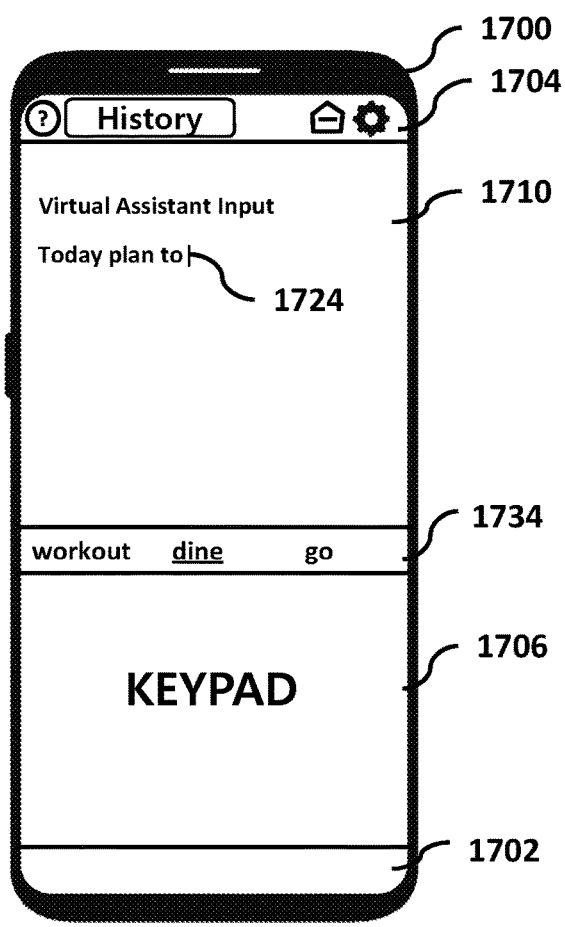

Referring to FIG. 17C, the user may use the virtual assistant 1710 to create a plan for today. The contextual recommendation engine 102 determines a calendar application as the domain for the input 1724 being provided by the user to the virtual assistant 1710 and recommends the calendar-related objects 1734 such as, but not limited to, 'workout', 'dine', 'go' and so on to the user using the Domain-specific LM. Further, the contextual recommendation engine 102 builds the calendar related objects as the antecedents based on the previous inputs received from the user. When the user performs any gesture on the recommended calendar related objects, the contextual recommendation engine 102 resolves the co-references by suggesting the actions related with the calendar related objects to the user. For example, the user may tap on the calendar related object 'workout' to view planned workout. The user may tap on the calendar related object 'dine' to add plans to dine out.

Figure 17D:
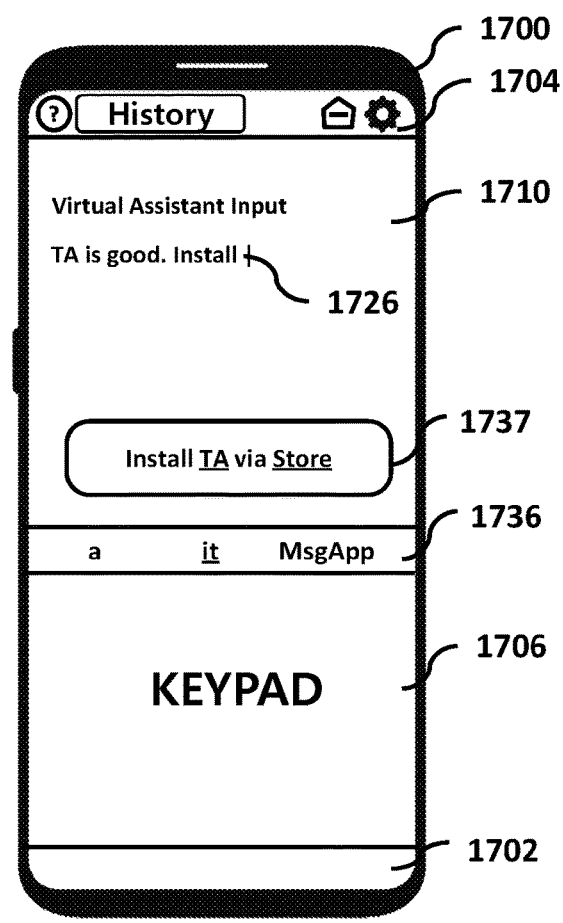

Referring to FIG. 17D, the user may use the virtual assistant 1710 to install an application 'TA.' The contextual recommendation engine 102 determines an application store as the domain for the input 1726 and recommends the application store related objects 1736 such as, but not limited to, 'a', 'it', 'messaging application' and so on using the Domain-specific LM. Further, the contextual recommendation engine 102 analyzes the previous inputs received from the user and cues from the domain identified for the input, determines the travelling application 'A' as the antecedent. Based on the antecedent, the contextual recommendation engine 102 generates the NLG as 'Install the application 'TA'.

FIGS. 18A, 18B, and 18C illustrate example user interfaces including a visual cue according to an embodiment of the disclosure.

In an embodiment, an electronic device 1800 may display a visual cue to a user based on co-reference resolution. Referring to FIG. 18A, the user receives a message 1820 from another user and further the visual cue may provide for antecedent 'link' in the received message 1820. When the user performs a gesture (tap) on the antecedent 'link', the contextual recommendation engine 102 may automatically scroll to the position wherein the link is shared. The contextual recommendation engine 102 may also provide a popup with a list of previously shared links.

Referring to FIG. 18B, the user may receive a message 1822 from another user and the visual cue is provided for the phrase 'talk to him'. When the user performs the gesture (the tap action) on the phrase 'talk to him', the contextual recommendation engine 102 understands the anaphor 'him', resolves the anaphor 'him' with a relevant contact and provides the relevant contact information to the user. In addition, the contextual recommendation engine 102 provides the actions (call/share) to be taken on the relevant contact information as suggestions to the user.

Referring to FIG. 18C, the user may receive a message 1824 from another user and the visual cue is provided for a phrase "shared it with you last week". When the user performs the gesture (the tap action) on the visual cue, the contextual recommendation engine 102 resolves an anaphora 'it' with at least one of a contact, a video, an audio, a link and so on and provides the at least one of the identified contact/video/audio/link as recommendations to the user. The contextual recommendation engine 102 provides the actions (call/share contact, play/download/open video/audio) to be taken on the relevant recommendations as suggestions to the user.

Figure 19:
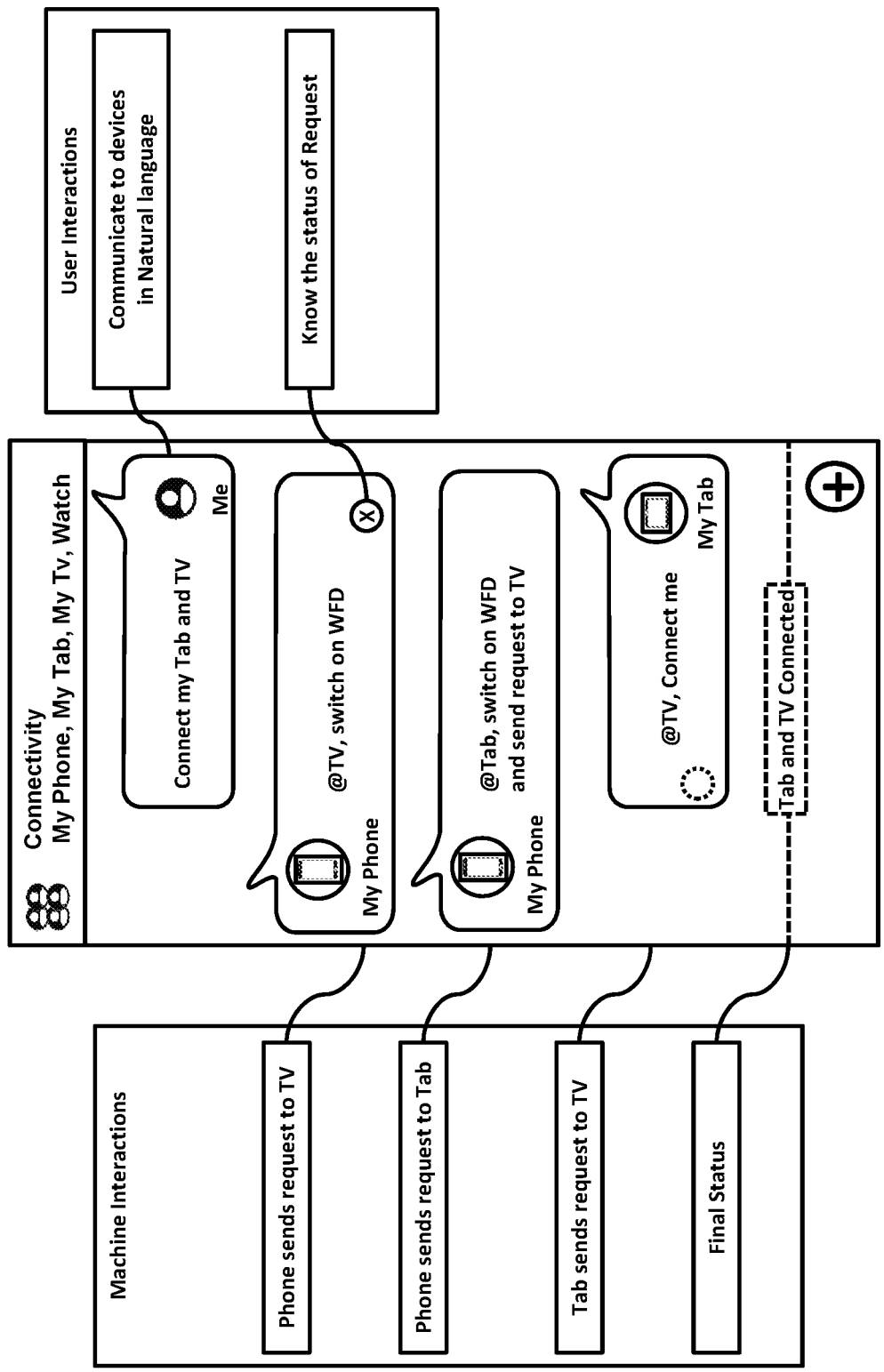
FIG. 19 is a diagram for explaining a method of controlling Internet of things (IoT) user devices according to an embodiment of the disclosure.

FIG. 19 is a diagram for explaining a method of controlling internet of things (IoT) user devices according to an embodiment of the disclosure.

In an embodiment, a user may use his electronic devices such as a smartphone, a tablet, a wearable device, a home hub, a home bridge to control IoT devices. Referring to FIG. 19, a user may enter a message requesting his phone to connect with a tablet and TV, and a response message may be received from the phone. Here, the user may use natural languages to communicate with the IoT devices. The IoT devices may be connected to each other via Wi-Fi Direct. During a connection with the IoT devices, an option to cancel the connection may be displayed in the response message of the IoT devices.

Figure 20:
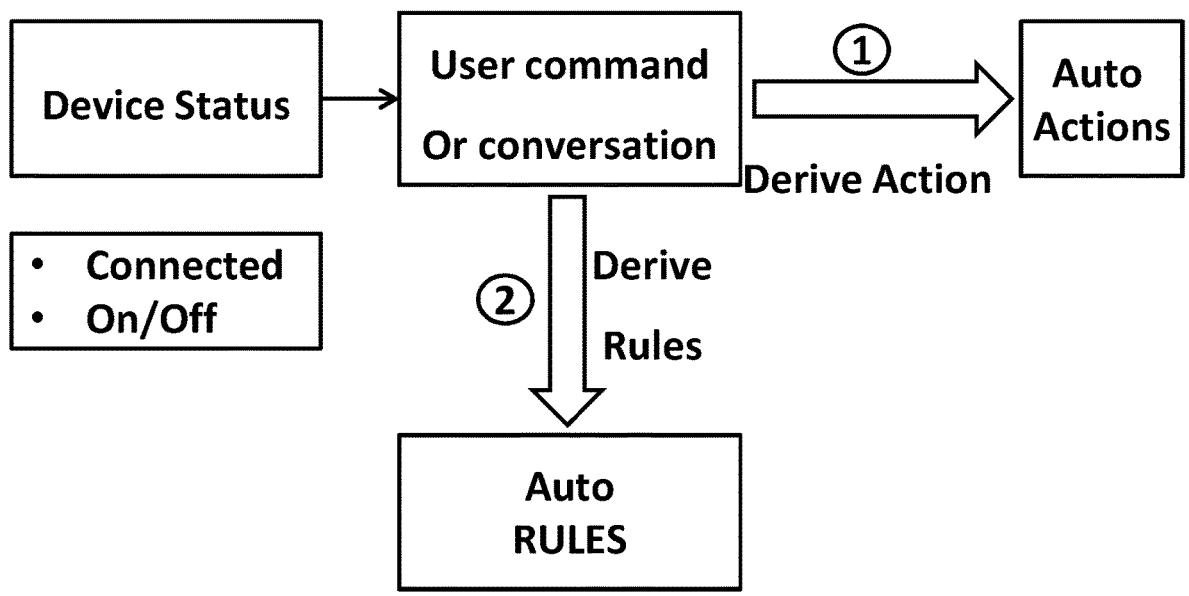
FIG. 20 is a diagram for explaining a method of performing an action and adding a rule according to an embodiment of the disclosure.

FIG. 20 is a diagram for explaining a method of performing an action and adding a rule according to an embodiment of the disclosure.

In an embodiment, devices may be connected to each other, turned ON or OFF. Based on user commands or natural language conversation, it may be possible to cause the IoT devices to perform an action, or generate a rule of performing the action. Performance of an action and generation of a rule may be performed automatically.

Figure 21:
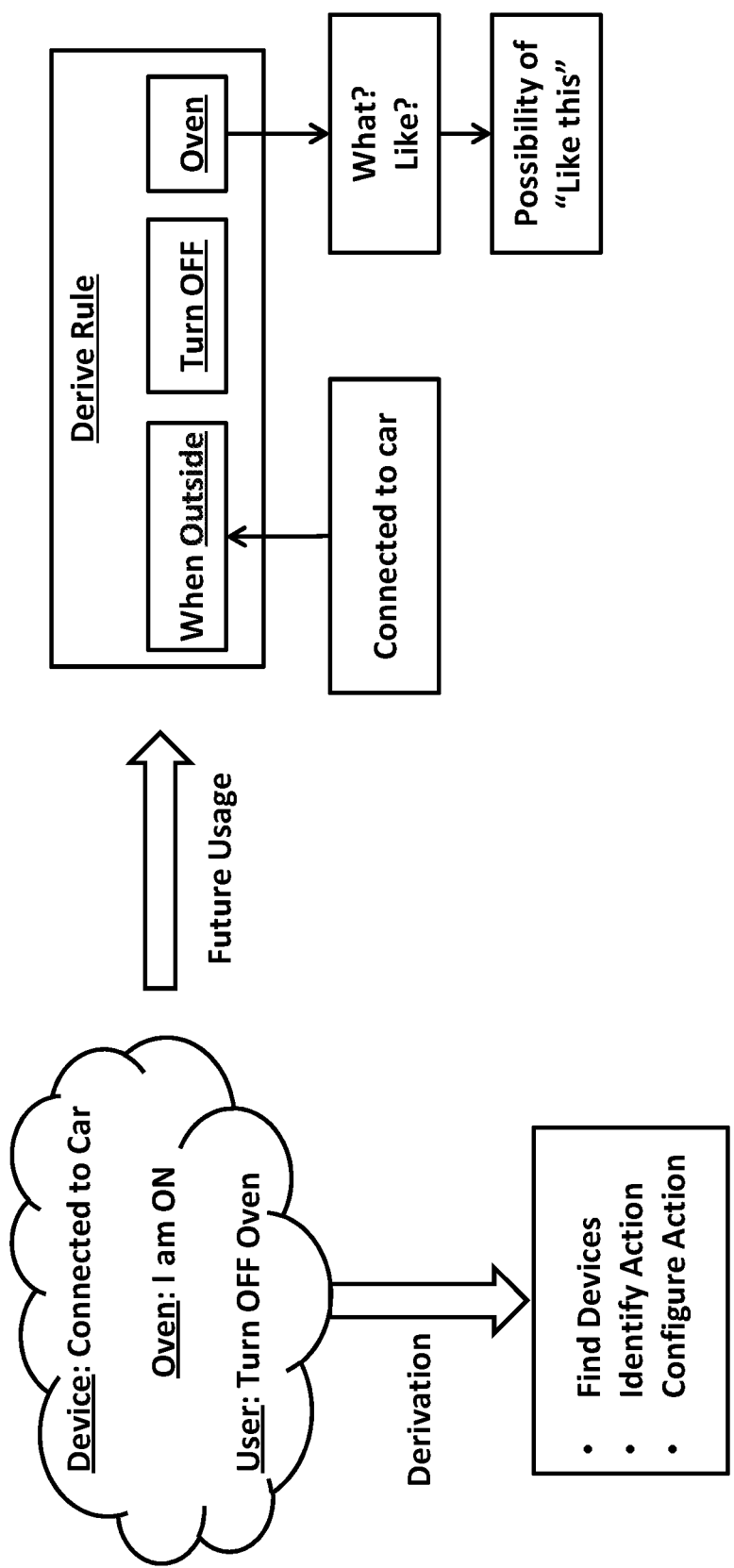
FIG. 21 is a diagram for explaining an action performed according to an embodiment of the disclosure.

FIG. 21 is a diagram for explaining an action performed according to an embodiment of the disclosure.

In an embodiment, a rule may be generated or action may be performed based on statuses of devices. For example, when a user's device is connected to a vehicle, and an oven is turned ON in his house, the user may need to find his device, identify an action to be performed. In an embodiment, when it is learned by a model that the oven is turned OFF when the user left his house, the model may cause the oven to turn OFF when the user is absent in his house or his device is connected to his car. Furthermore, based on whether the user adjusts settings or change a course of actions, whether the user is satisfied with automatic performance of actions and automatic rule generation may be determined.

Figure 22:
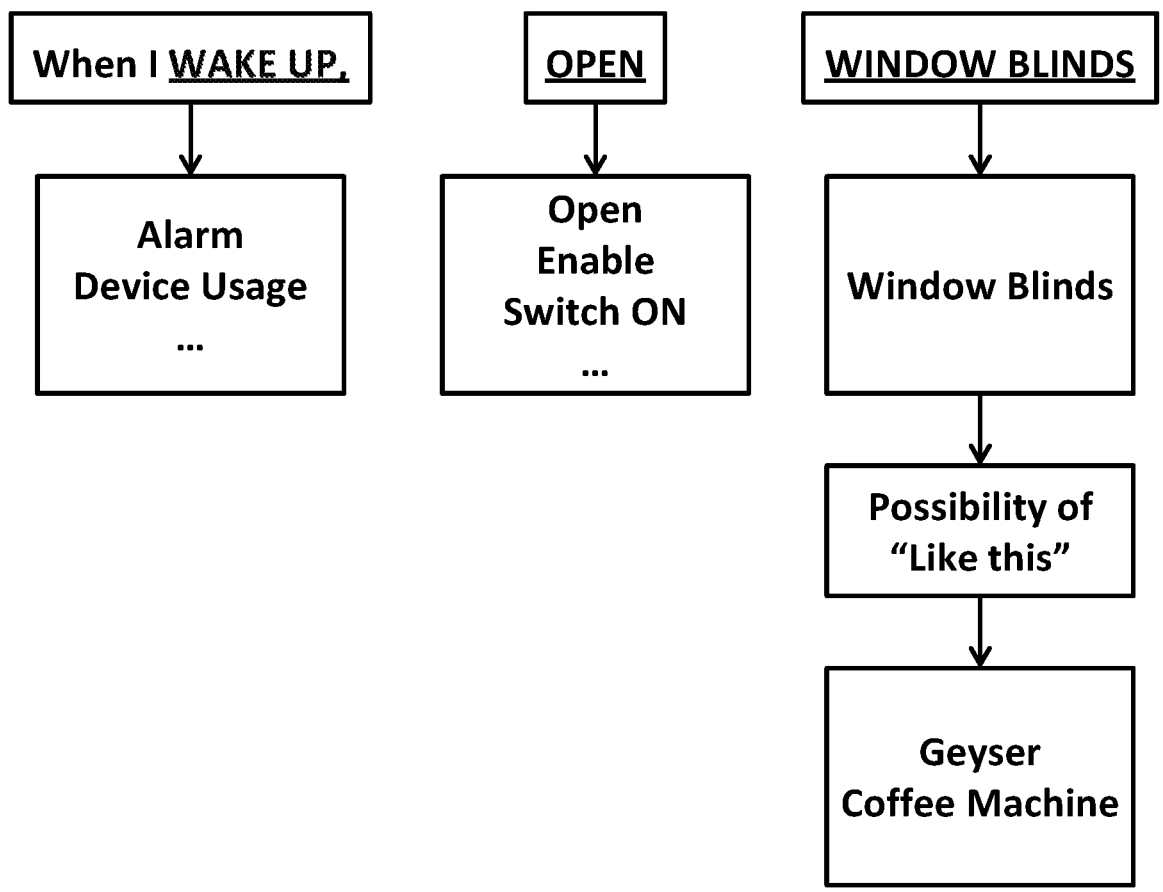
FIG. 22 is a diagram for explaining a method of providing a prediction based on a routine of a user according to an embodiment of the disclosure.

FIG. 22 is a diagram for explaining a method of providing a prediction based on a routine of a user according to an embodiment of the disclosure.

As an initial command, "When I WAKE UP, OPEN WINDOW BLINDS" may be entered to the electronic device. In an embodiment, an alarm or device status may be adjusted based on "WAKE UP." Operations of "Open", "Enable", "Switch ON" may be performed based on "OPEN." Operation on Window Blinds may be performed based on "WINDOW BLINDS." That is, the window blind may be opened in response to a user waking up. In an embodiment, a course of actions that the user might like may be automatically performed by monitoring the user's behavioural pattern. For example, water may be heated in response to the user waking up, without the user's request. The user may let the action to continue or stop the action, which may be reflected to a learning model to analyze the user's preferences.

Figure 23:
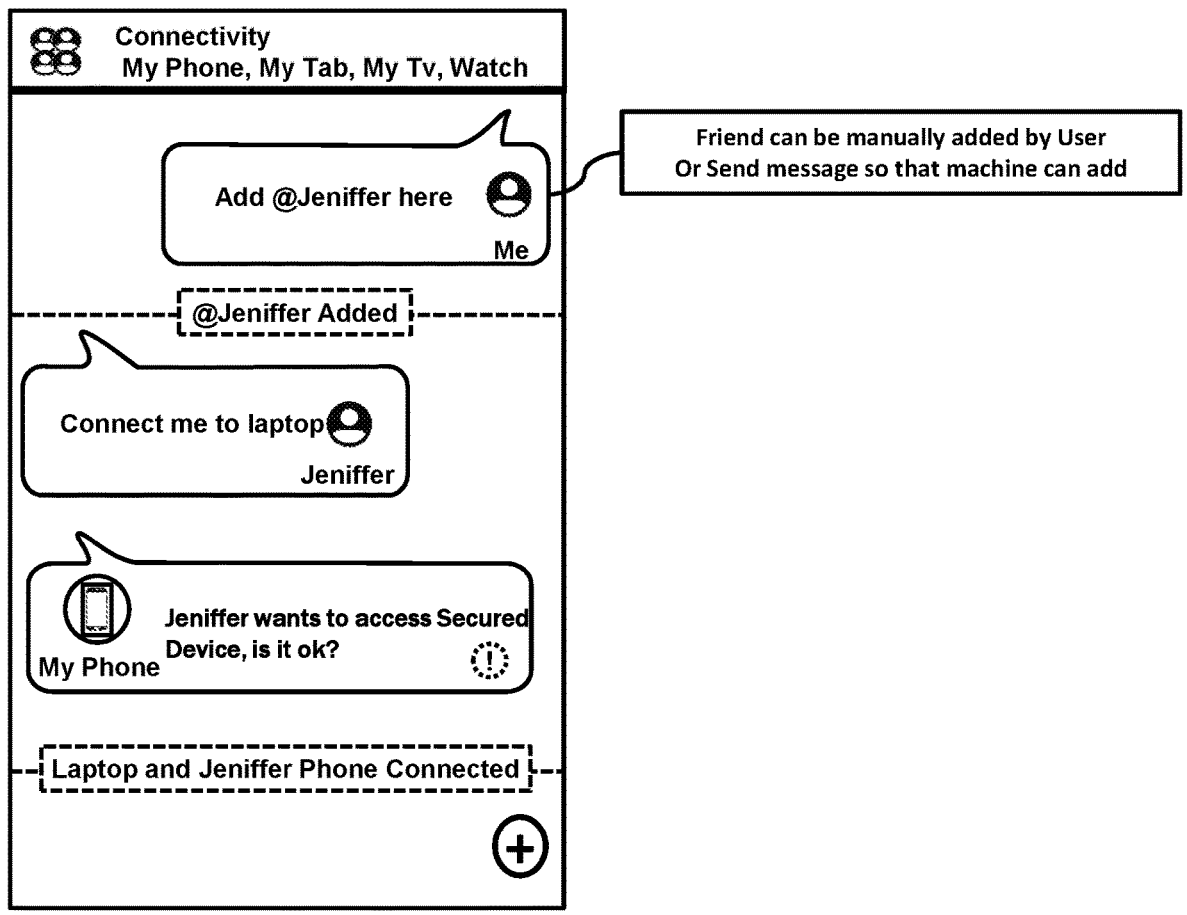
FIG. 23 is a diagram for explaining a method of enabling another user to control user devices of a user according to an embodiment of the disclosure.

FIG. 23 is a diagram for explaining a method of enabling another user to control user devices of a user according to an embodiment of the disclosure.

In an embodiment, the user may allow an unidentified user to communicate with the user's one or more device. For example, when the user's house has a visitor (the unidentified user), the unidentified user may try to communicate with the user's devices. The user may add the unidentified user to a temporary group to allow the unidentified user to communicate with the user's devices. The user may schedule a time period, where the unidentified user or device may communicate with the user or the user's devices. The user may manually remove the unidentified user.

Figure 24:
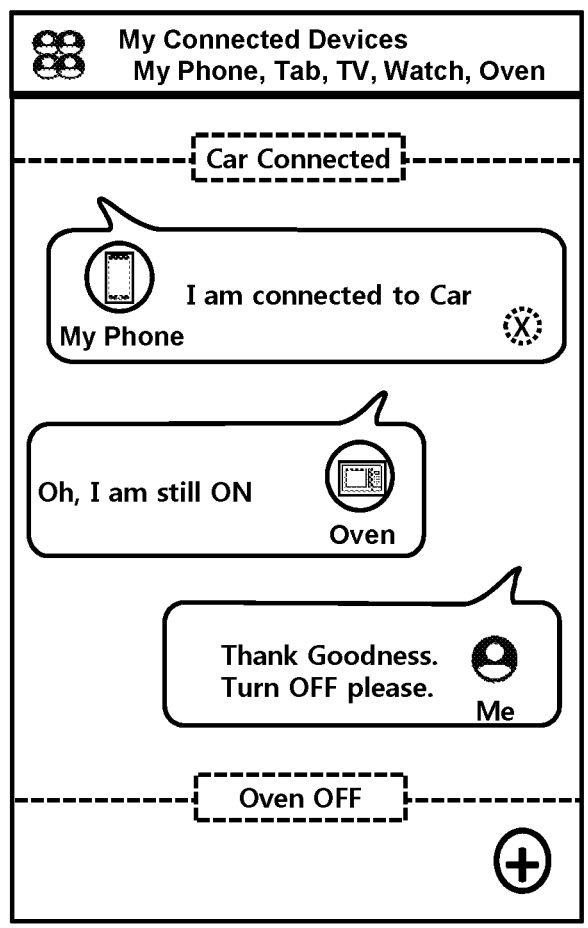
FIG. 24 is a diagram for explaining a method of controlling user devices when a user is absent according to an embodiment of the disclosure.

FIG. 24 is a diagram for explaining a method of controlling user devices when a user is absent according to an embodiment of the disclosure.

For example, a user device may be connected to a car of the user while the user is not at home. One or more connected devices may provide their status to the user device. The user device may also take one or more actions based on the received status. For example, the user may turn off all of his devices.

Figure 25:
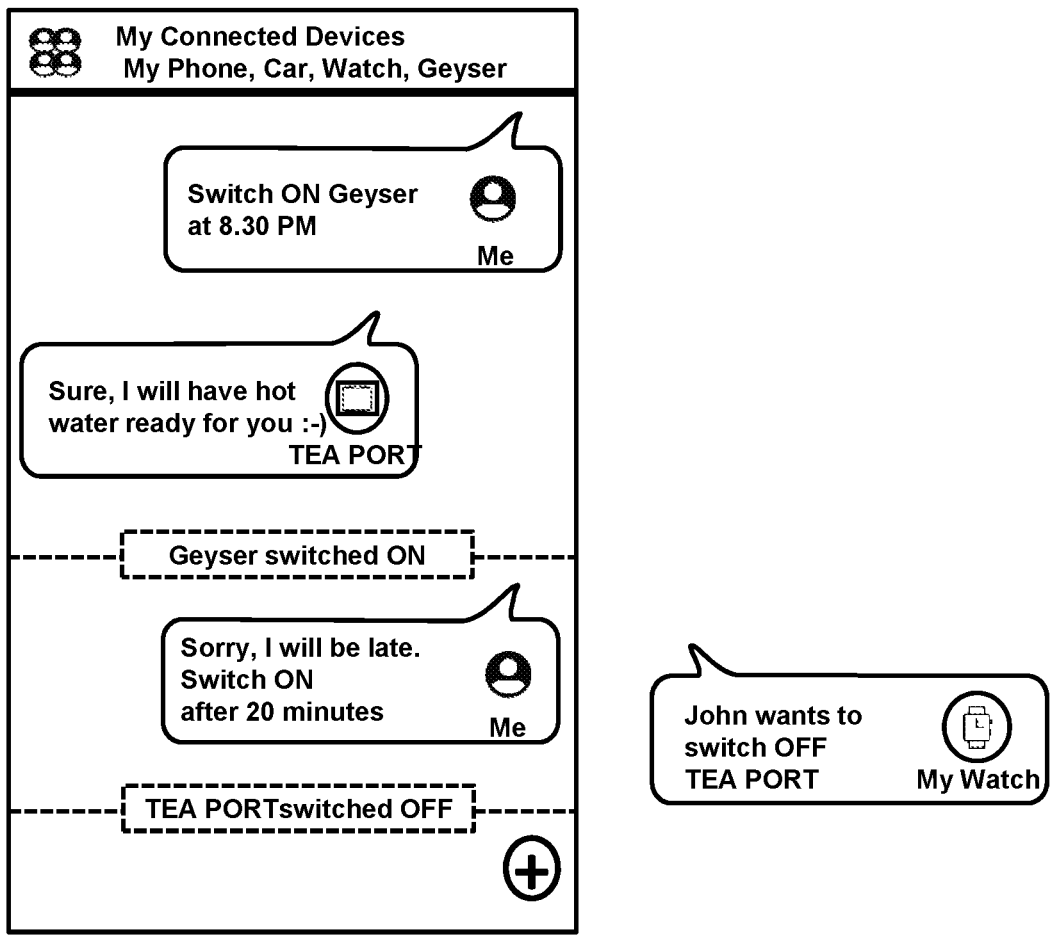
FIG. 25 is a diagram for explaining a method of controlling user devices based on a schedule according to an embodiment of the disclosure.

FIG. 25 is a diagram for explaining a method of controlling user devices based on a schedule according to an embodiment of the disclosure.

In an embodiment, the user device may communicate with one or more devices according to pre-determined schedule. The user may configure a schedule for communicating specific instructions to one or more devices. For example, ON-notification may be received at the user's device (smart watch) from Geyser coffee machine. The user may access the notification and cancels it to switch OFF the geyser. Communication records may be visible as part of the message log.

Figure 26:
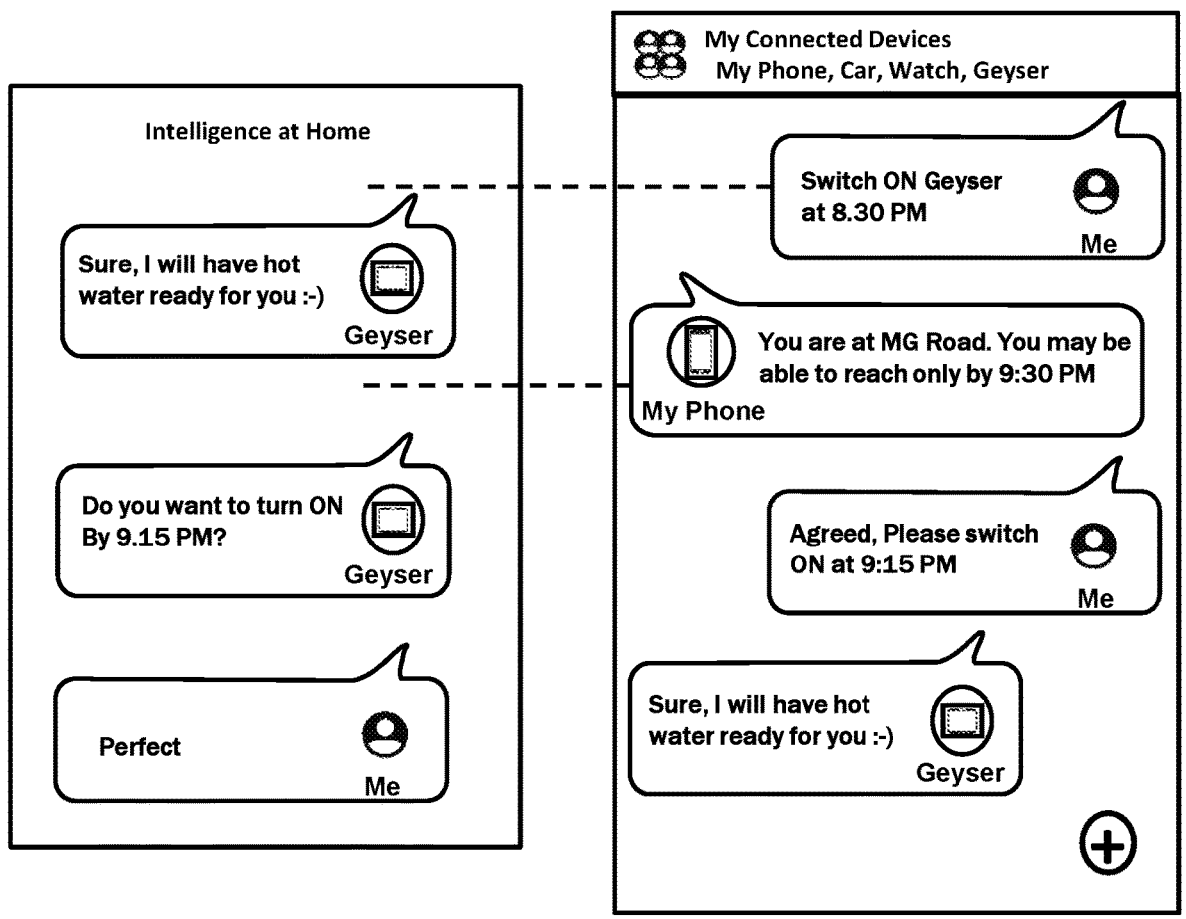
FIG. 26 is a diagram for explaining a method of controlling user devices based on a location of a user according to an embodiment of the disclosure.

FIG. 26 is a diagram for explaining a method of controlling user devices based on a location of a user according to an embodiment of the disclosure.

In an embodiment, when the device finds that the user is driving around MG road, the device may determine whether a request of the user is appropriate to be processed. For example, when the user requested that Geyser coffee machine should be turned ON at 8:30, but he is expected to arrive at home at 9:30, the device may notify the user.

Figure 27:
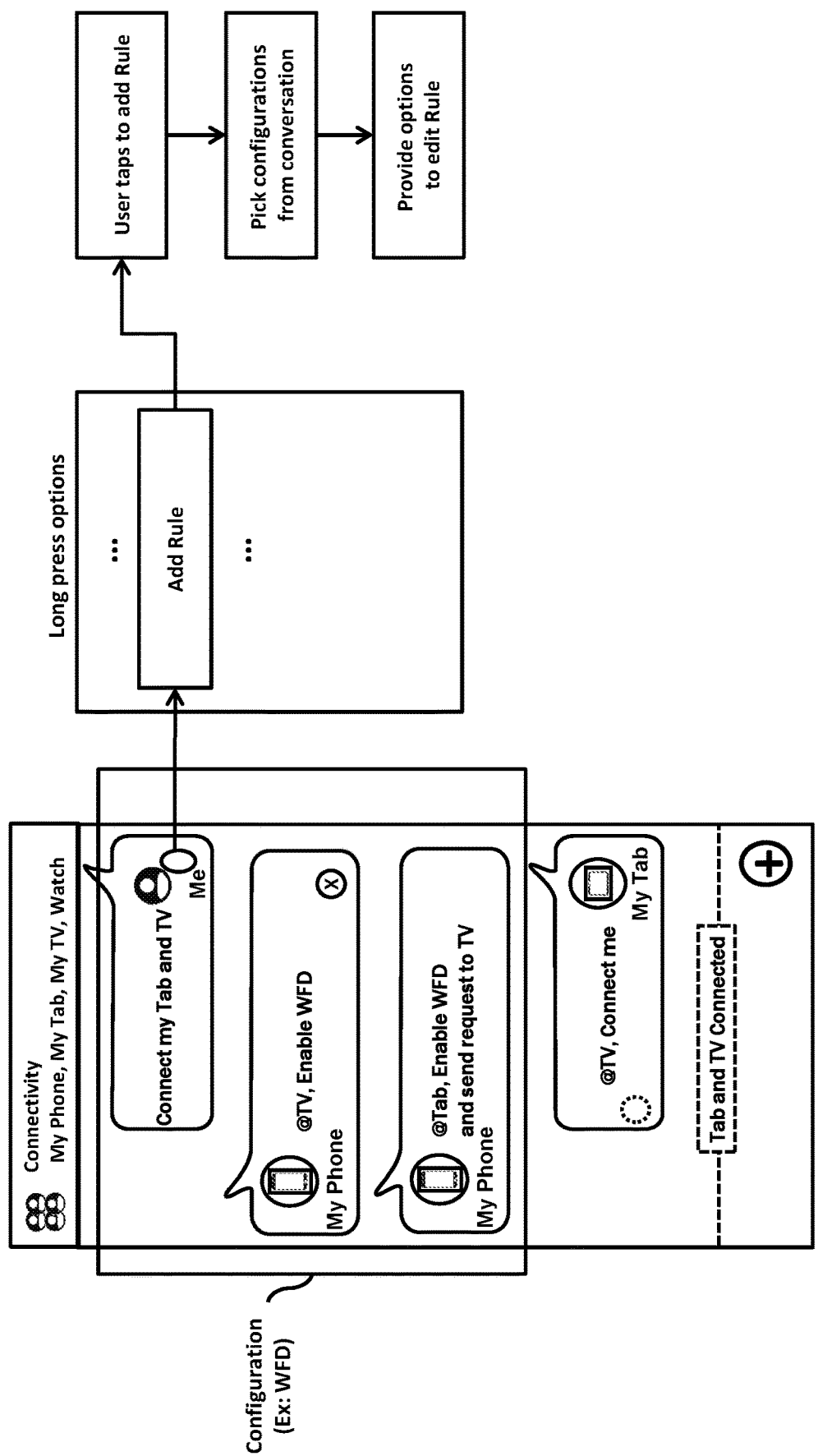
FIG. 27 is a diagram for explaining a method of adding a rule from a conversation according to an embodiment of the disclosure.

FIG. 27 is a diagram for explaining a method of adding a rule from a conversation according to an embodiment of the disclosure.

In an embodiment, the device may enable the user to add rules from a conversation and the device may use the rules in future. Rules may be auto created or may be added or edited by the user.

Figure 28:
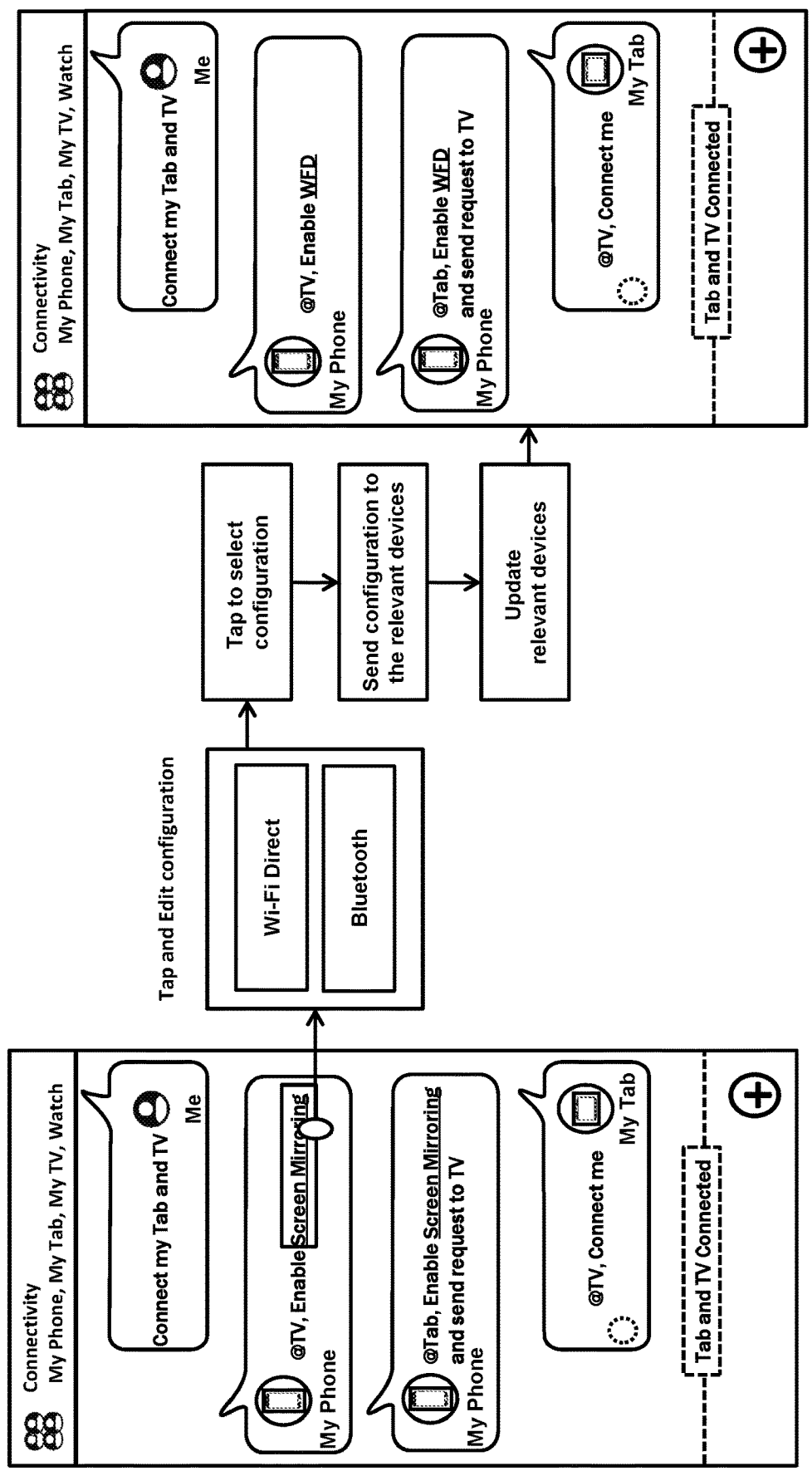
FIG. 28 is a diagram for explaining a method of adjusting settings of user devices according to an embodiment of the disclosure.

FIG. 28 is a diagram for explaining a method of adjusting settings of user devices according to an embodiment of the disclosure.

In an embodiment, the user may access the configuration using a communication means such as, but not limited to, Wi-Fi Direct, Bluetooth, and so on. The user may select the configuration and may edit/control the configuration. The updated configurations may be sent to the relevant devices and the relevant devices may be updated accordingly.

Figure 29:
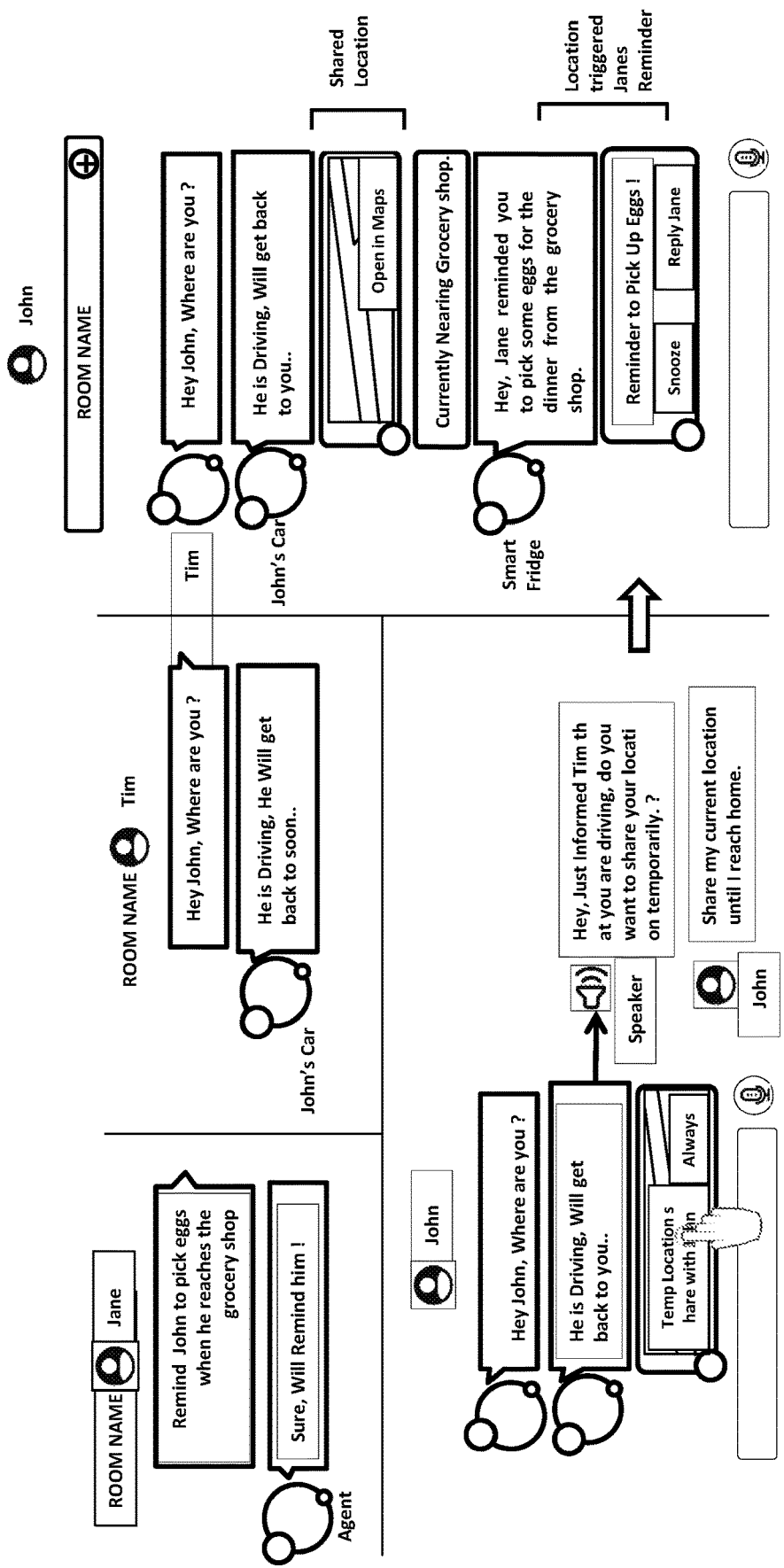
FIG. 29 is a diagram for explaining a method of adjusting authority of a plurality of users according to an embodiment of the disclosure.

FIG. 29 is a diagram for explaining a method of adjusting authority of a plurality of users according to an embodiment of the disclosure.

According to an embodiment, different authorities may be given to a plurality of users.

Figure 30:
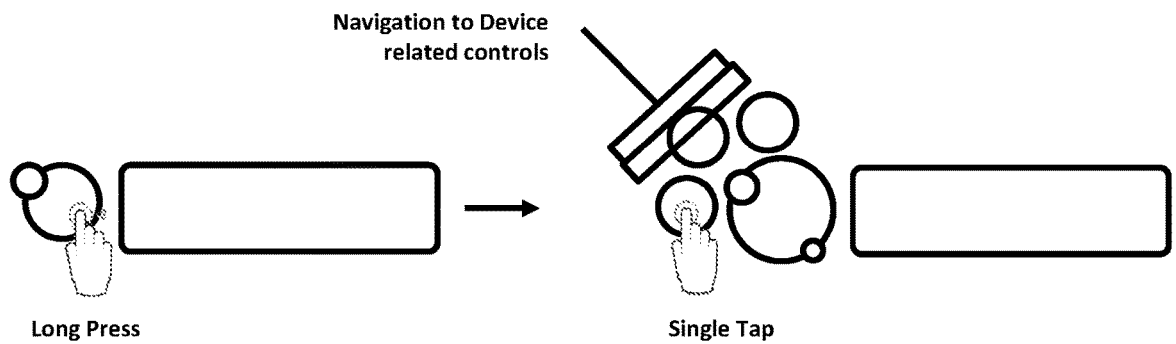
FIG. 30 is a diagram for explaining a user interaction for calling functions of a user device according to an embodiment of the disclosure.

FIG. 30 is a diagram for explaining a user interaction for calling functions of a user device according to an embodiment of the disclosure.

Referring to FIG. 30, a user may navigate control of IoT devices by a long-press on a profile image of the IoT device.

Figure 31:
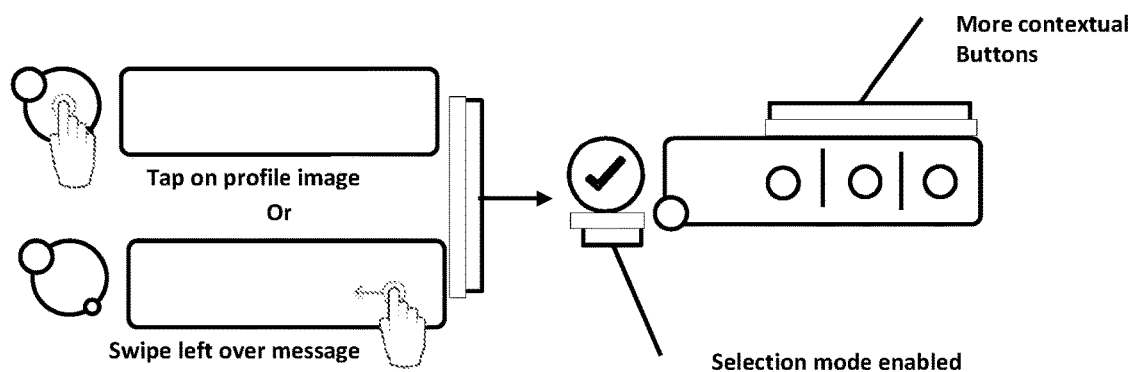
FIG. 31 is a diagram for explaining a user interaction for selecting a user device according to an embodiment of the disclosure.

FIG. 31 is a diagram for explaining a user interaction for selecting a user device according to an embodiment of the disclosure.

Referring to FIG. 31, a user may select a certain IoT device based on a user tap on the profile image of the IoT device, or swiping through a message of the IoT device. The selected device may be removed from IoT environment, or its priority may be adjusted among other devices.

Figure 32:
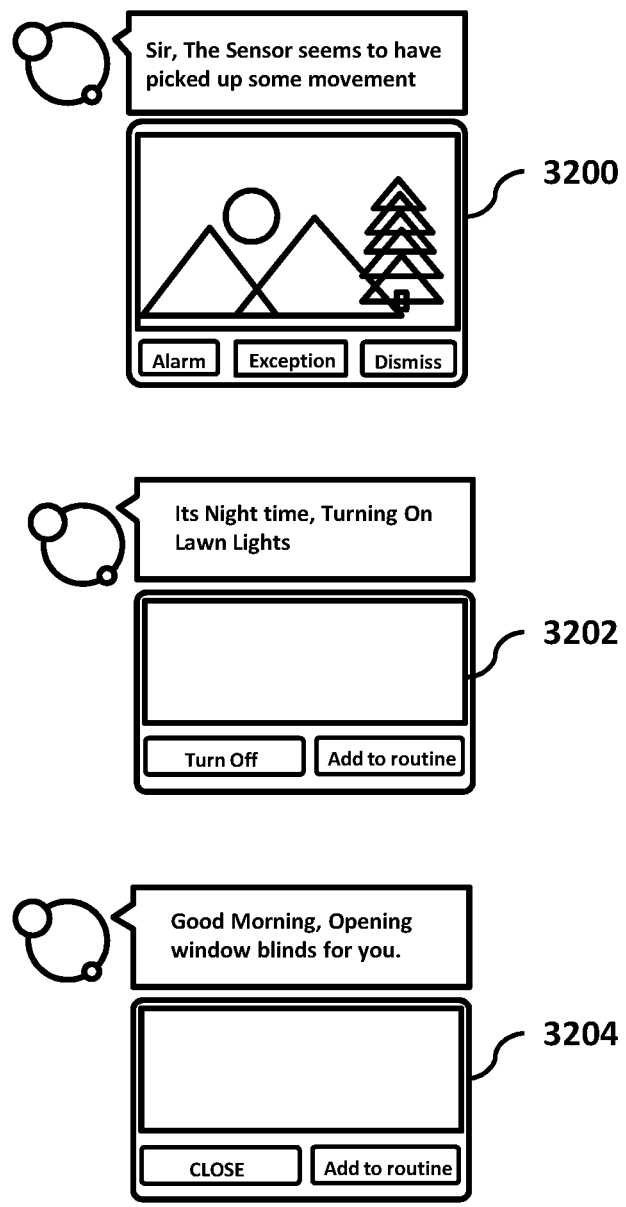
FIG. 32 is a diagram for explaining provisions of predictive action according to an embodiment of the disclosure.

FIG. 32 is a diagram for explaining provisions of predictive action according to an embodiment of the disclosure.

In an embodiment, the user device may propose, based on user's routine or his behavioural pattern, IoT device settings which the user may like. For example, when a sensor detects movements, the sensor may ask the user whether he wants to be notified with detected movement or not (3200). For example, whether to turn on lawn light in the night may be asked to the user (3202). For example, whether to open window blinds in the morning may be asked to the user (3204).

Various embodiments disclosed herein may be implemented through at least one software program running on at least one hardware device and performing network management functions to control the elements. Elements shown in FIGS. 1, FIG. 2, and FIG. 3A may be at least one of a hardware device, or a combination of hardware device and software module.

The various embodiments describe methods and systems for providing the contextual recommendations to the user. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g. very high-speed integrated circuit hardware description language (VHDL) another programming language, or implemented by one or more VHDL or several software modules being executed on at least one hardware device. The hardware device may be any kind of portable device that may be programmed. The device may also include means which could be e.g. hardware means like e.g. an application-specific integrated circuit (ASIC), or a combination of hardware and software means, e.g. an ASIC and a field-programmable gate array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of CPUs.

The foregoing description of the specific embodiments will so fully reveal the general nature of the various embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein may be practiced with modification within the spirit and scope of the various embodiments as described herein.

The various actions, acts, blocks, operations, or the like in the flow diagram may be performed in the order presented, in a different order or simultaneously. Further, in some embodiments, some of the actions, acts, blocks, operations, or the like may be omitted, added, modified, skipped, or the like without departing from the scope of the disclosure.

The various embodiments disclosed herein may be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a memory storing instructions; and
at least one processor configured to execute the instructions to:
receive a user input message at the electronic device to communicate with another electronic device,
receive from the other electronic device a message including a word,
display the message on a display of the electronic device,
identify, based on a language model, an application corresponding to the message and the user input message,
identify, in the user input message, a reference object indicated by the word of the message based on the identified application,
highlight the word in the displayed message,
access a local database to obtain a user in put history including the user input message and represent the user input history in a form of a feature vector of floating point numbers, and
display, based on receiving a selection of the highlighted word in the displayed message, recommendations for completing an input to reply to the message, including the identified reference object,
wherein the language model is trained based on the displaying of the recommendations in the identified application, the identified reference object indicated by the word, and the identified application.

2. The electronic device of claim 1,
wherein the identified application is executable by the at least one processor, and
wherein the displaying of the recommendations is a function of the identified application.

3. The electronic device of claim 1, wherein the identified application is correlated mostly with the word among a plurality of applications.

4. The electronic device of claim 3, wherein a correlation between the word and the identified application is learned by the language model.

5. The electronic device of claim 1,
wherein the identified application is running on a foreground of the electronic device,
wherein the message is displayed on the identified application, and
wherein the displaying of the recommendations is a function of the identified application.

6. The electronic device of claim 1,
wherein the reference object relates to a hyperlink, and
wherein the reply to the message comprises transmission of the hyperlink.

7. The electronic device of claim 1,
wherein the reference object relates to a file, and
wherein the reply to the message comprises attachment of the identified reference object.

8. The electronic device of claim 1,
wherein the word comprises a noun word, and
wherein the at least one processor is further configured to execute the instructions to identify a co-reference word of the noun word, the co-reference word indicating the reference object.

9. The electronic device of claim 1,
wherein the word comprises an anaphora word, and
wherein the at least one processor is further configured to execute the instructions to identify an antecedent word of the anaphora word, the antecedent word indicating the reference object.

10. The electronic device of claim 1,
wherein the word comprises a verb word, and
wherein the at least one processor is further configured to execute the instructions to identify an object word for the verb word, the object word indicating the reference object.

11. The electronic device of claim 1, wherein the at least one processor is further configured to execute the instructions to use a virtual assistant to reply to the message.

12. The electronic device of claim 1, wherein the at least one processor is further configured to execute the instructions to use a voice command to reply to the message.

13. A method comprising:
receive a user input message at an electronic device to communicate with another electronic device;
receive from the other electronic device a message including a word;
displaying the received message;
identifying, based on a language model, an application corresponding to the message and the user input message;
identifying, in the user input message, a reference object indicated by the word of the message based on the identified application;
highlighting the word in the displayed message;
accessing a local database to obtain a user input history including the user input message and represent the user input history in a form of a feature vector of floating point numbers; and
displaying, based on receiving a selection of the highlighted word in the displayed message, recommendations for completing an input to reply to the message, including the identified reference object,
wherein the language model is trained based on the displaying of the recommendations in the identified application, the identified reference object indicated by the word, and the identified application.

14. A non-transitory computer readable medium comprising instructions which, when executed by at least one processor of an electronic device, cause the electronic device to:
receive a user input message at the electronic device to communicate with another electronic device,
receive from the other electronic device a message including a word,
display the received message on a display of the electronic device,
identify, based on a language model, an application corresponding to the message and the user input message,
identify, in the user input message, a reference object indicated by the word of the message based on the identified application,
highlight the word in the displayed message,
access a local database to obtain a user input history including the user input message and represent the user input history in a form of a feature vector of floating point numbers, and
display, based on receiving a selection of the highlighted word, recommendations for completing an input to reply to the message, including the identified reference object,
wherein the language model is trained based on the displaying of the recommendations in the identified application, the identified reference object indicated by the word, and the identified application.

* * * * *